(12) United States Patent
Garthwaite

(10) Patent No.: US 7,085,790 B2
(45) Date of Patent: Aug. 1, 2006

(54) ADVANCING CARS IN TRAINS MANAGED BY A COLLECTOR BASED ON THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 568 days.

(21) Appl. No.: 10/313,476

(22) Filed: Dec. 6, 2002

(65) Prior Publication Data

US 2004/0111444 A1 Jun. 10, 2004

(51) Int. Cl.
*G06F 12/00* (2006.01)
*G06F 17/30* (2006.01)

(52) U.S. Cl. .................. 707/206; 707/205

(58) Field of Classification Search .......... 707/1, 707/100, 103 R, 200, 203, 206, 205; 711/6, 711/133, 136, 160, 170–173
See application file for complete search history.

(56) References Cited

U.S. PATENT DOCUMENTS

| | | |
|---|---|---|
| 4,724,521 A | 2/1988 | Carron et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilson et al. |
| 5,687,370 A | 11/1997 | Garst et al. |
| 5,801,943 A | 9/1998 | Nasburg |
| 5,845,278 A | 12/1998 | Kirsch et al. |
| 5,845,298 A | 12/1998 | O'Connor et al. |
| 5,857,210 A | 1/1999 | Tremblay et al. |
| 5,873,104 A | 2/1999 | Tremblay et al. |
| 5,873,105 A | 2/1999 | Tremblay et al. |
| 5,900,001 A * | 5/1999 | Wolczko et al. ............ 707/206 |
| 5,903,900 A * | 5/1999 | Knippel et al. ............. 707/206 |
| 5,930,807 A | 7/1999 | Ebrahim et al. |

(Continued)

FOREIGN PATENT DOCUMENTS

EP 0 904 055 A1 9/1999

(Continued)

OTHER PUBLICATIONS

Robert Courts: "Improving locality of Reference In a Garbage Collection Memory management System", 1988, Communication of the ACM, vol. 31, Issue 9, pp. 1128-1138.*

(Continued)

*Primary Examiner*—Greta Robinson
*Assistant Examiner*—Jacques Veillard
(74) *Attorney, Agent, or Firm*—Kudirka & Jobse, LLP

(57) ABSTRACT

In a garbage collector that employs the train algorithm, the collector identifies cars that are located far back in the collection order but already have large remembered sets, and it advances their collection. One way of doing so includes advancing a car's nominal position in the collection order, placing it nominally ahead of erstwhile "older" cars as well as actually. Another way does not include changing the advanced car's nominal position. The advancement operation is simpler with the latter approach, but normal updating is simpler with the former. Although both approaches tend to increase the number of entries in the remembered set of the car thus advanced, they actually reduce the overall memory cost of remembered-set maintenance.

25 Claims, 26 Drawing Sheets

U.S. PATENT DOCUMENTS

| | | | |
|---|---|---|---|
| 5,953,736 A | 9/1999 | O'Connor et al. | |
| 5,960,087 A | 9/1999 | Tribble et al. | |
| 5,999,974 A | 12/1999 | Ratcliff et al. | |
| 6,021,415 A | 2/2000 | Cannon et al. | |
| 6,047,125 A | 4/2000 | Agesen et al. | |
| 6,049,390 A | 4/2000 | Notredame et al. | |
| 6,049,810 A | 4/2000 | Schwartz et al. | |
| 6,065,020 A | 5/2000 | Dussud | |
| 6,098,089 A | 8/2000 | O'Connor et al. | |
| 6,148,309 A | 11/2000 | Azagury et al. | |
| 6,148,310 A * | 11/2000 | Azagury et al. | 707/206 |
| 6,173,294 B1 * | 1/2001 | Azagury et al. | 707/206 |
| 6,185,581 B1 | 2/2001 | Garthwaite | |
| 6,226,653 B1 | 5/2001 | Alpern et al. | |
| 6,243,720 B1 | 6/2001 | Munter et al. | |
| 6,260,120 B1 | 7/2001 | Blumenau et al. | |
| 6,289,358 B1 | 9/2001 | Mattis et al. | |
| 6,308,185 B1 * | 10/2001 | Grarup et al. | 707/206 |
| 6,314,436 B1 | 11/2001 | Houldsworth | |
| 6,321,240 B1 | 11/2001 | Chilimbi et al. | |
| 6,353,838 B1 | 3/2002 | Sauntry et al. | |
| 6,381,738 B1 | 4/2002 | Choi et al. | |
| 6,393,439 B1 | 5/2002 | Houldsworth et al. | |
| 6,415,302 B1 | 7/2002 | Garthwaite et al. | |
| 6,424,977 B1 | 7/2002 | Garthwaite | |
| 6,434,576 B1 | 8/2002 | Garthwaite | |
| 6,434,577 B1 | 8/2002 | Garthwaite | |
| 6,442,661 B1 | 8/2002 | Dreszer | |
| 6,449,626 B1 | 9/2002 | Garthwaite et al. | |
| 6,496,871 B1 | 12/2002 | Jagannathan et al. | |
| 6,529,919 B1 | 3/2003 | Agesen et al. | |
| 6,567,905 B1 | 5/2003 | Otis | |
| 6,640,278 B1 | 10/2003 | Nolan et al. | |
| 6,757,890 B1 | 6/2004 | Wallman | |
| 6,769,004 B1 | 7/2004 | Barrett | |
| 6,820,101 B1 | 11/2004 | Wallman | |
| 6,826,583 B1 | 11/2004 | Flood et al. | |
| 6,868,488 B1 * | 3/2005 | Garthwaite | 711/173 |
| 6,892,212 B1 | 5/2005 | Shuf et al. | |
| 6,928,460 B1 | 8/2005 | Nagarajan et al. | |
| 6,931,423 B1 | 8/2005 | Sexton et al. | |
| 2002/0032719 A1 | 3/2002 | Thomas et al. | |
| 2002/0095453 A1 | 7/2002 | Steensgaard | |
| 2002/0133533 A1 | 9/2002 | Czajkowski et al. | |
| 2002/0138506 A1 | 9/2002 | Shuf et al. | |
| 2003/0088658 A1 | 5/2003 | Davies et al. | |
| 2003/0200392 A1 | 10/2003 | Wright et al. | |
| 2003/0217027 A1 | 11/2003 | Farber et al. | |
| 2004/0010586 A1 | 1/2004 | Burton et al. | |
| 2004/0039759 A1 | 2/2004 | Detlefs et al. | |
| 2004/0215914 A1 | 10/2004 | Dussud | |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

P. Roy et al.: "Garbage Collection in object-oriented databases using transactional cyclic reference counting", 1998, the VLDB Journal—The International Journal on very Large Da bases, vol. 7, Issue 3, pp. 179-193.*

Richard L. Hudson et al.: "Garbage Collection the World One Car at a time", 1997, Conference on Object Oriented Programming System Languages and Applications; Proceedings of the 12th ACM SIGPLAN conference on Object-oriented programming, pp. 162-175.*

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Available at http://www.daimi.au.dk/-jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/-jacobse/Papers/.

Clark and Mason, "Compacting Garbage Collection can be Fast and Simple," Software—Practice and Experience, Feb. 1996, pp. 177-194, vol. 26, No. 2.

Henry Baker, "List Processing in Real Time on a Serial Computer," Communications of the ACM 21, 4, Apr. 1978, pp. 280-294.

Appel, Ellis, and Li, "Real-time Concurrent Collection on Stock Multiprocessors," ACM SIGPLAN Notices, 1998.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 402-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

U.S. Appl. No. 10/287,851, filed Nov. 5, 2002, Garthwaite et al.

Appleby, Karen, "Garbage Collection for Prolog Based on WAM, vol. 31, Issue 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Clark, "An Efficient List-Moving Algorithm Using Constant Workspace, vol. 19 No. 6", Communications of the ACM, Jun. 1976, 352-354.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Holzle, Urs, "A Fast Write Barrier for Generational Garbage Collectors", Workshop on Garbage Collection in Object Oriented Systems, Oct. 1993.

Hudson, et al., "A Language—Independent Garbage Collector Toolkit", Coins Techincal Report, Sep. 1991.

Hudson, et al., "Training Distributed Garbage: The DMOS Collector", University of St. Andrews Tech Report, 1997, 1-26.

Hudson, et al., "Sapphire: Copying GC Without Stopping the World", Practice and Experience Special Issue, Date Unknown, JAVA/Grande/Iscope.

Liskov, et al., "Partitioned Garbage Collection of a Large Stable Heap", Proceedings of IWOOOS, 1996, 117-121.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Development Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Shuf, et al., "Exploiting Profilic Types for Memory Management and Optimizations. ACM ISBN Sep. 2, 2001", POPL, Jan. 2002, Portland.

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, parts 1-18.

Wilson, "Uniprocessor Garbage Collection Techniques", Proceedings of Int'l Workshop on Memory Management, 1992, V. 637.

Withington, P.T., "How Real is "Real-Time" GC?", Symbolics, Inc., Oct. 6, 1991, Burlington, MA.

Zee, et al., "Write Barrier Removal by Static Analysis", OOPSLA '02, Nov. 2002.

Zorn, "Segregating Heap Objects by Reference Behavior and Lifetime", In 8th Int'l Conferenceon Architechural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, V. 34(3), ACM Press, Vancouver, Canada.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173, ACM PRESS, Montreal, Canada.

Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.

Pirinen, Pekka, "Barrier Techniques for Incremental Tracing", Harlequin Limited, Date Unknown, 20-25, Cambridge, Great Britain.

* cited by examiner

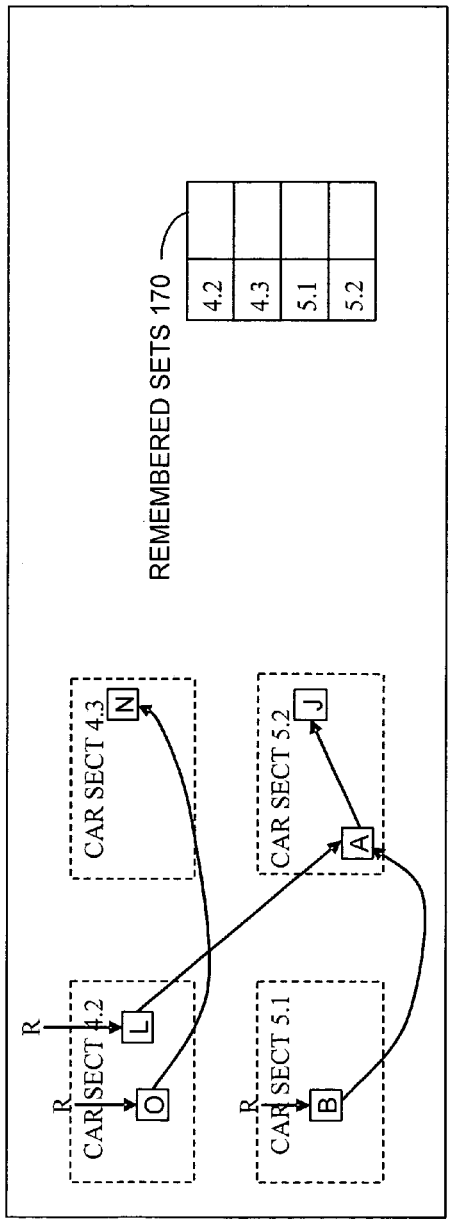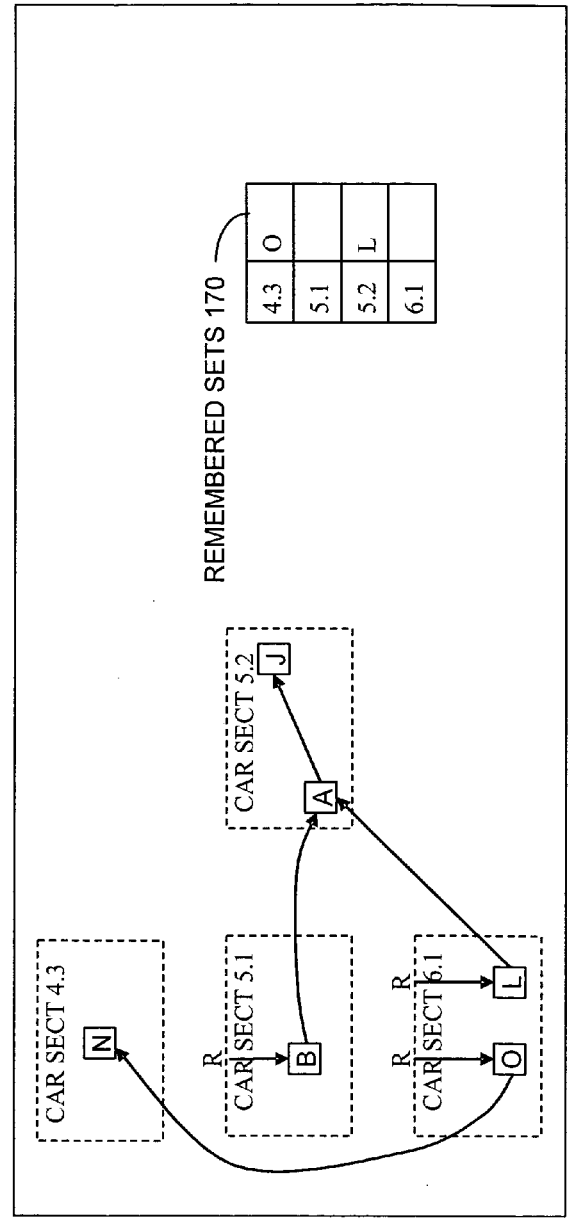
FIG. 12I (Prior Art)
FIG. 12J (Prior Art)

ADVANCING CARS IN TRAINS MANAGED BY A COLLECTOR BASED ON THE TRAIN ALGORITHM

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.) Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do not use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIG. 8 depicts an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

As the above discussion shows, remembered sets greatly limit the need to scan for references to objects in a car being collected. But remembered-set use exacts a memory-space cost. When the mutator employs many references or changes references frequently, the size of the memory space that remembered sets occupy can be a significant fraction of the size of the generation they are used to manage.

SUMMARY OF THE INVENTION

I have developed a way of reducing this memory cost. When the remembered set associated with a given car becomes large, I advance the car in the collection order, making it "older" so that it will be collected sooner than would otherwise be the case. It might at first seem that thus advancing cars whose remembered sets are large would be counterproductive; since advancing a car places more cars behind it, potentially more remembered-set entries have to be added to keep track of "younger" cars' references. But it turns out that advancing such cars actually reduces the remembered-set burden in the long run. Since cars that have large remembered sets do not stay in the collection queue as long, the average remembered-set size tends to be reduced. And a car that spends less time in the collection queue tends to have a smaller remembered set when it reaches collection, because it will likely have fewer "stale" entries, i.e., entries that result from locations where references resided at one time but no longer do.

Also, advancing cars whose remembered sets are large expedites popular-object collection, which can have certain beneficial effects. One possible effect occurs in those collectors that place highly popular objects in their own, single-object cars when they are collected. As was explained in U.S. Pat. No. 6,185,581, which was issued on Feb. 6, 2001, to Alexander T. Garthwaite for a Train-Algorithm-Based Garbage Collector Employing Fixed-Size Remembered Sets, there are ways to restrict the sizes of such cars' remembered sets, and opportunities for thus reducing remembered-set size are presented earlier if cars containing popular objects are advanced. Even if popular objects are not thus treated specially, the evacuation of a popular object attendant to its car's collection reduces the remembered-set memory burden, because the popular object is likely to be placed in a car that it shares with some of its references, for which remembered-set entries will therefore no longer be required.

So advancing cars that have large remembered sets tends to reduce the overall remembered-set memory burden even though it temporarily increases the sizes of the advanced cars' remembered sets.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN
ILLUSTRATIVE EMBODIMENT

The present invention is directed to garbage collectors that employ the train algorithm, but the train algorithm can be implemented in collectors whose operational sequences depart significantly from the sequence that FIGS. 8–11 above illustrate. Although the sequence there illustrated contemplates executing an entire collection increment in a single interval dedicated only to collection activity, there are ways of spreading a collection increment over multiple intervals. Alternatively, most or all of the collection increment can be performed concurrently with mutator operation, although, as was indicated above, this tends to be somewhat complex. Additionally, although the train algorithm is usually implemented in a multi-generational collector in which, as was described above, a larger, old generation is managed in accordance with the train generation, whereas as a smaller, young one is not, there is no reason in principle why collectors that use the train algorithm need to be arranged in this fashion.

Figure 13A:
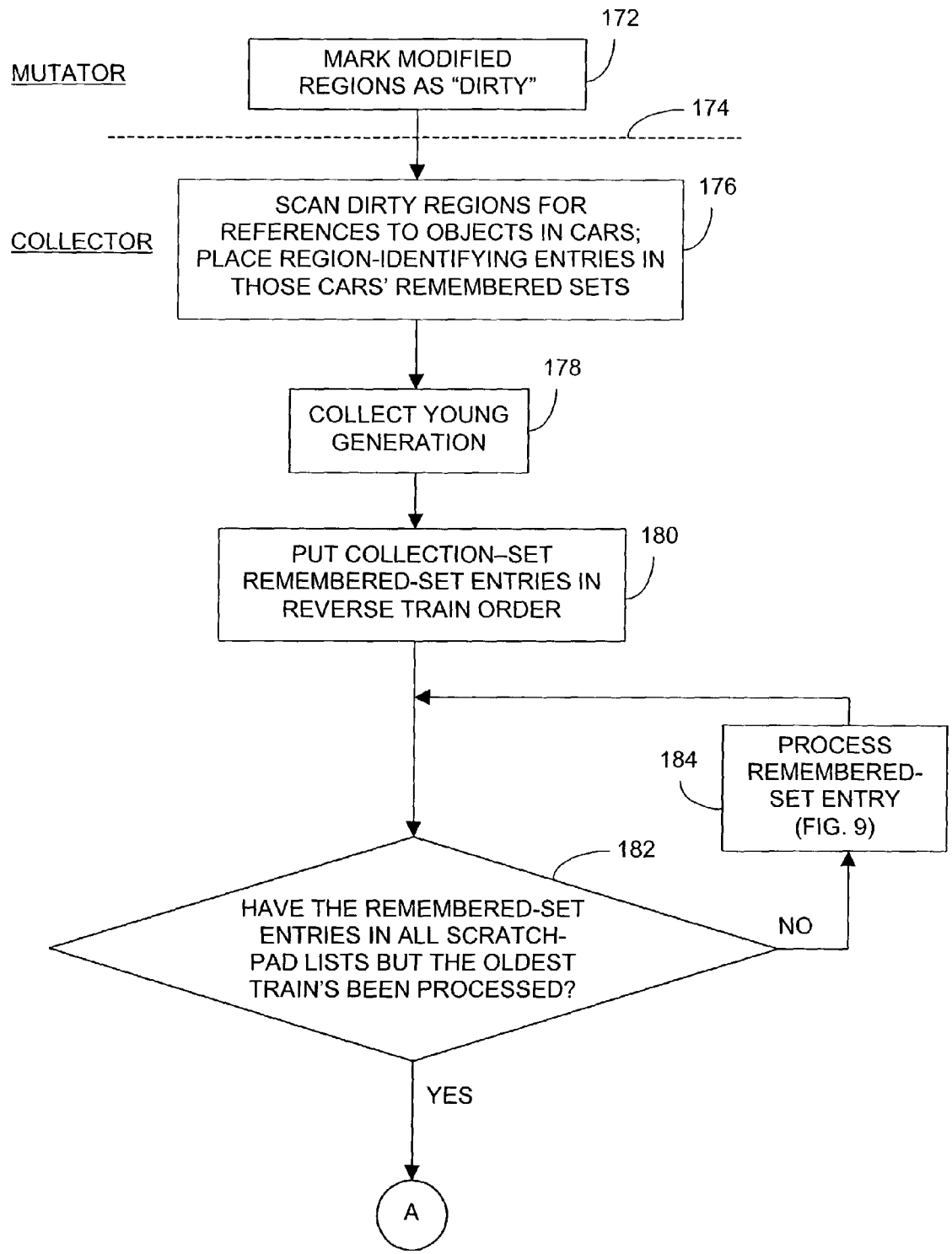
FIGS. 13A and 13B together constitute a flow chart that illustrates a collection interval, as FIGS. 8A and 8B do, but illustrates optimizations that FIGS. 8A and 8B do not include.
Figure 13B:
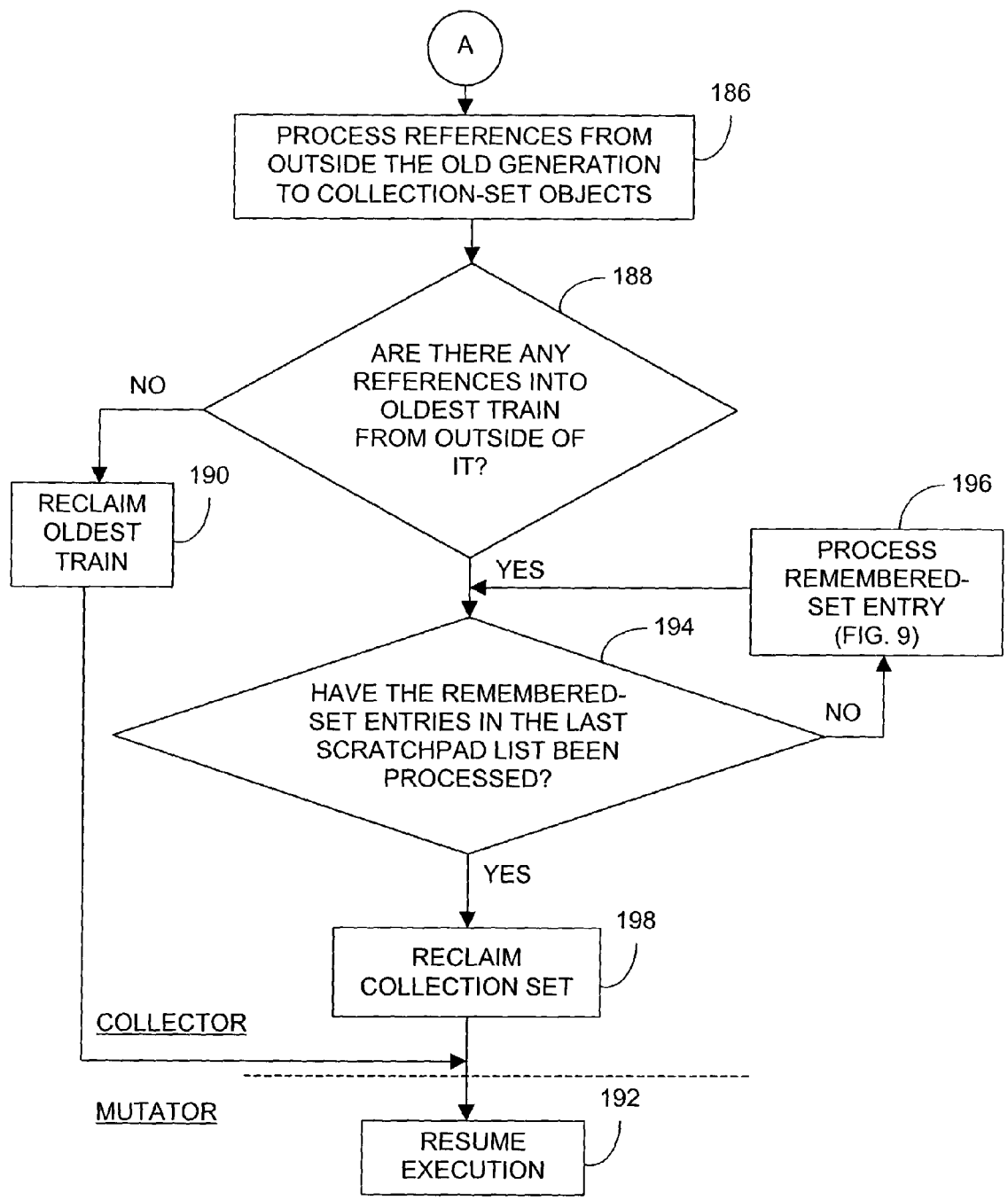

All that is necessary is that the evacuation policy tend to place related objects into common trains and that the trains be checked for any strong references and reclaimed if they have none, as was explained above. Indeed, even in arrangements of the general type exemplified above in connection with FIGS. 8–11, in which an entire increment is performed in a single collection interval directed to a portion of an old generation, the sequence can differ from the one there illustrated. For example, FIGS. 13A and 13B (together, "FIG. 13") depict in simplified form an approach that I prefer.

Whereas it was tacitly assumed above that, as is conventional, only a single car section would be collected in any given collection interval, the FIG. 13 sequence contemplates collecting more than a single car during a collection increment. FIG. 13 also depicts certain optimizations that some of the invention's embodiments may employ.

Figure 1:
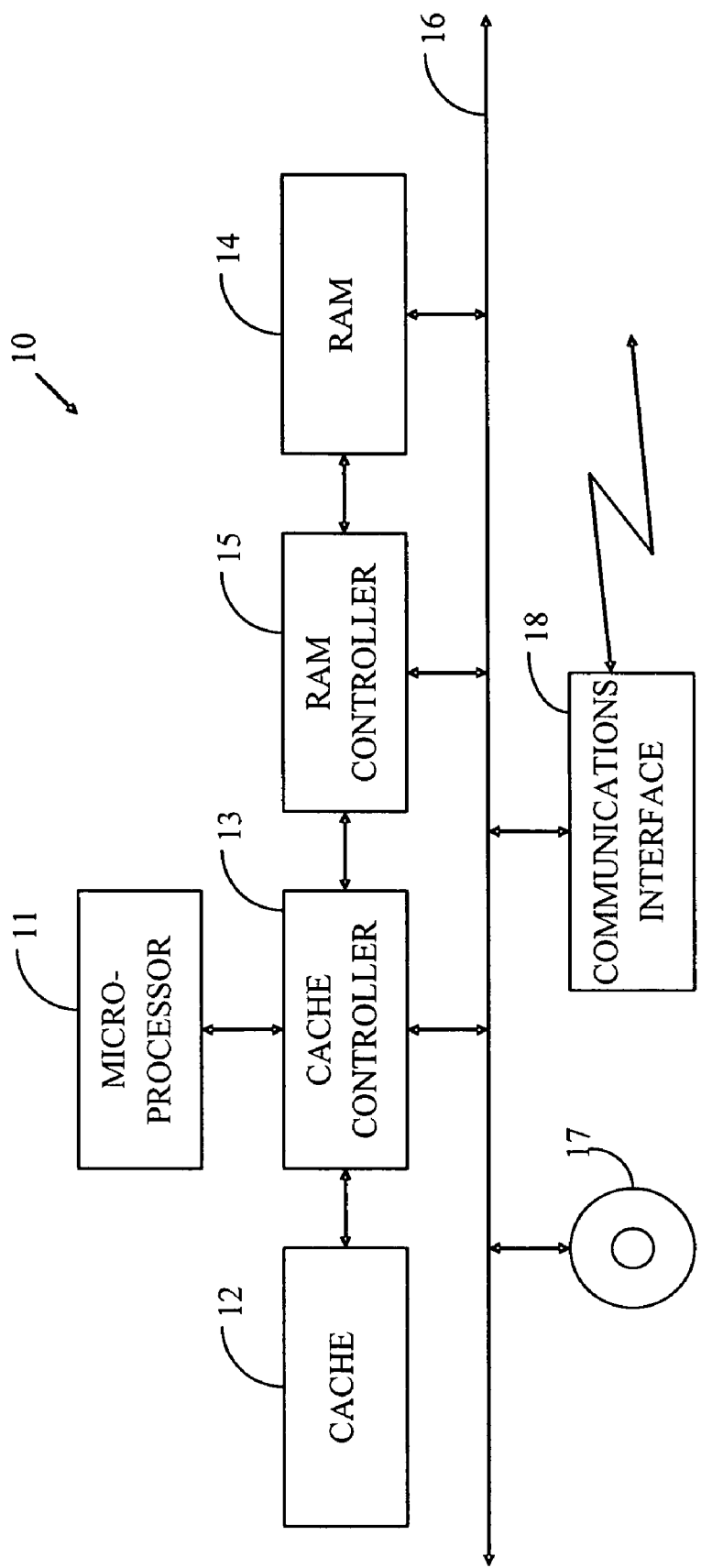
FIG. 1, discussed above, is a block diagram of a computer system in which the present invention's teachings can be practiced.
Figure 2:
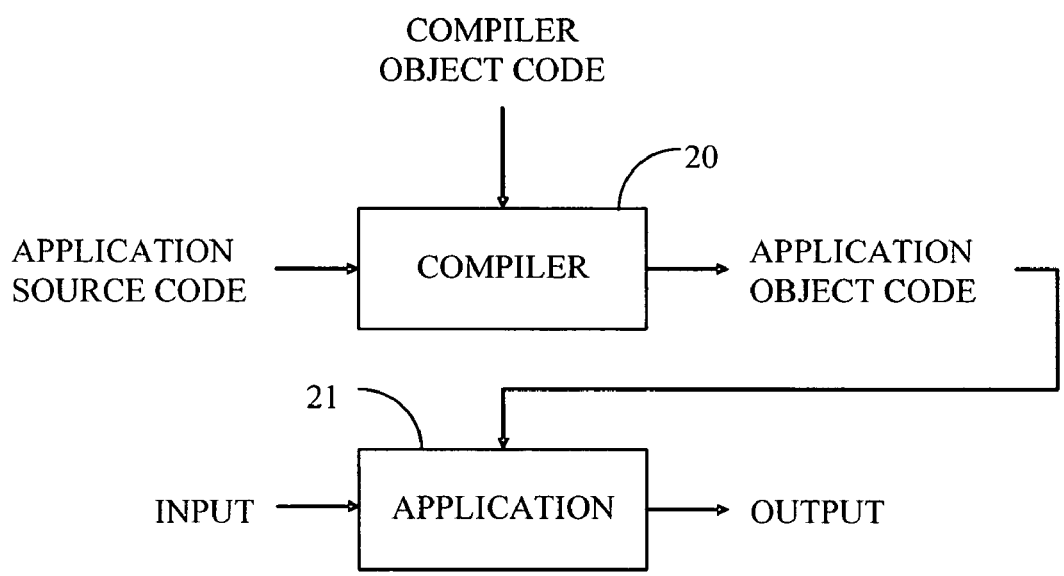
FIG. 2 is, discussed above, is a block diagram that illustrates a compiler's basic functions.
Figure 3:
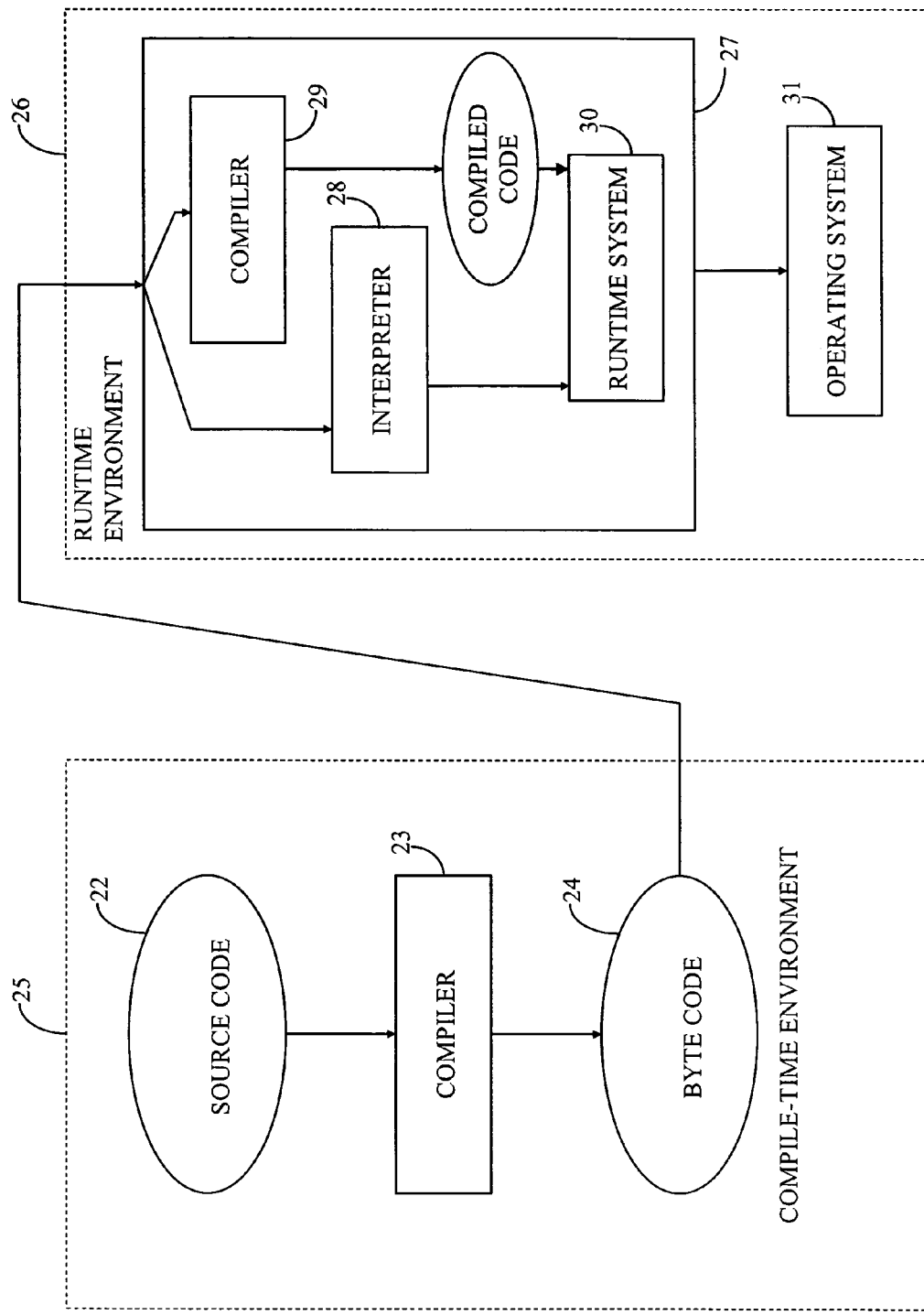
FIG. 3, discussed above, is a block diagram that illustrates a more-complicated compiler/interpreter organization.
Figure 4:
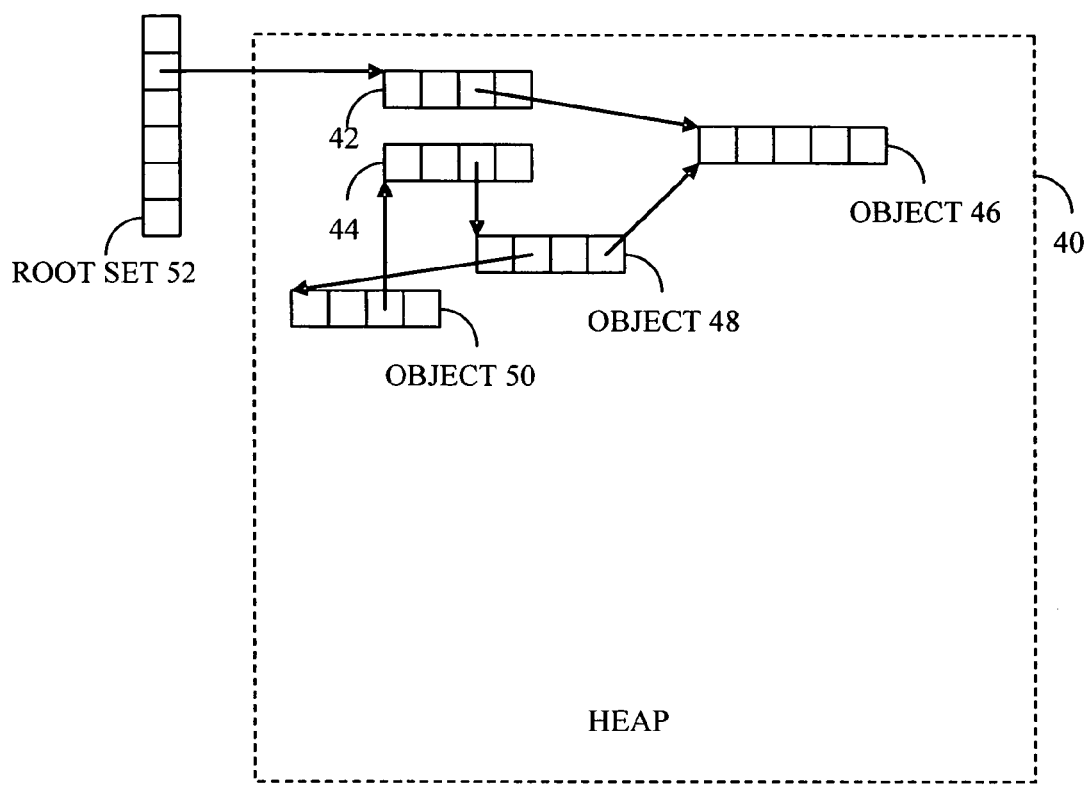
FIG. 4, discussed above, is a diagram that illustrates a basic garbage-collection mechanism.
Figure 5:
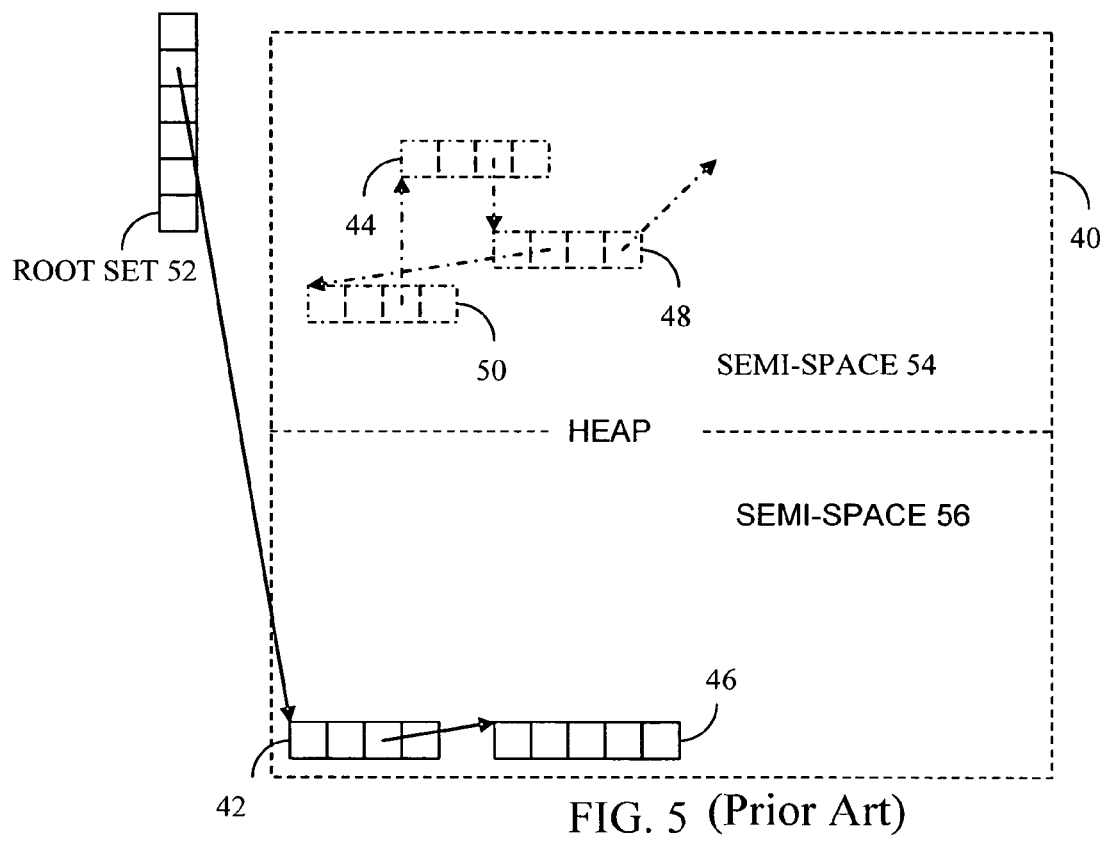
FIG. 5, discussed above, is a similar diagram illustrating that garbage-collection approach's relocation operation.
Figure 6:
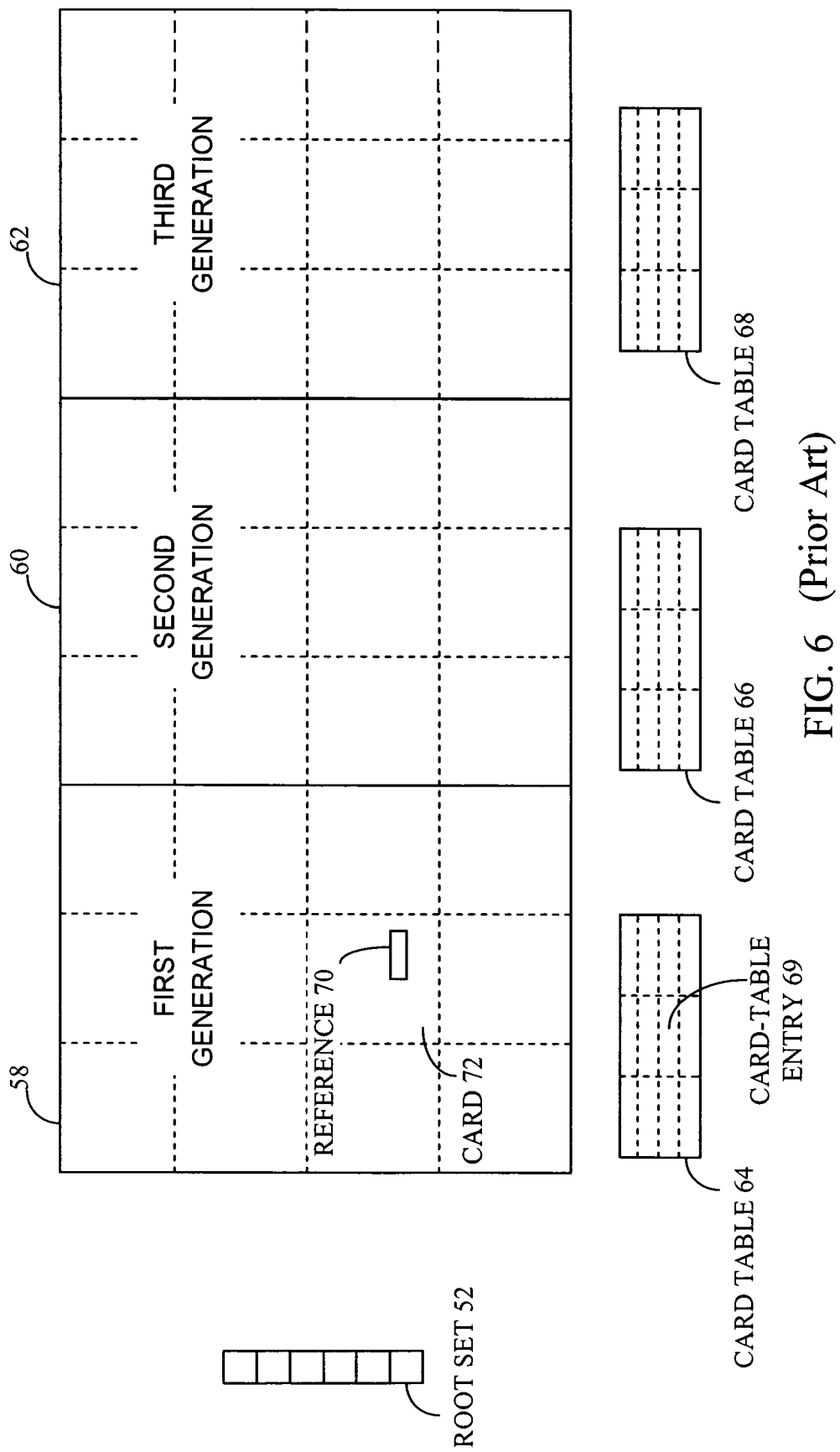
FIG. 6, discussed above, is a diagram that illustrates a garbage-collected heap's organization into generations.
Figure 7:
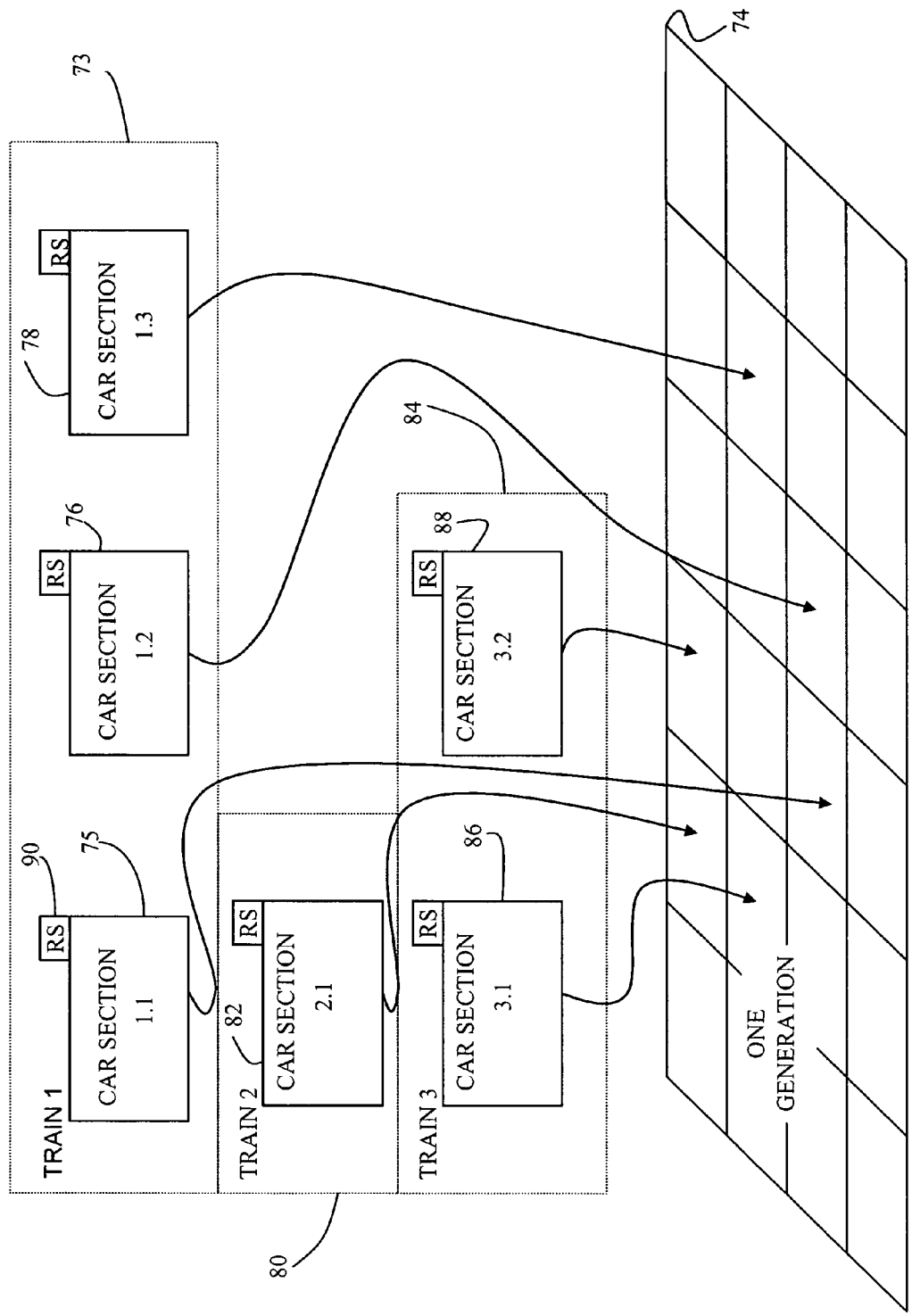
FIG. 7, discussed above, is a diagram that illustrates a generation organization employed for the train algorithm.
Figure 8A:
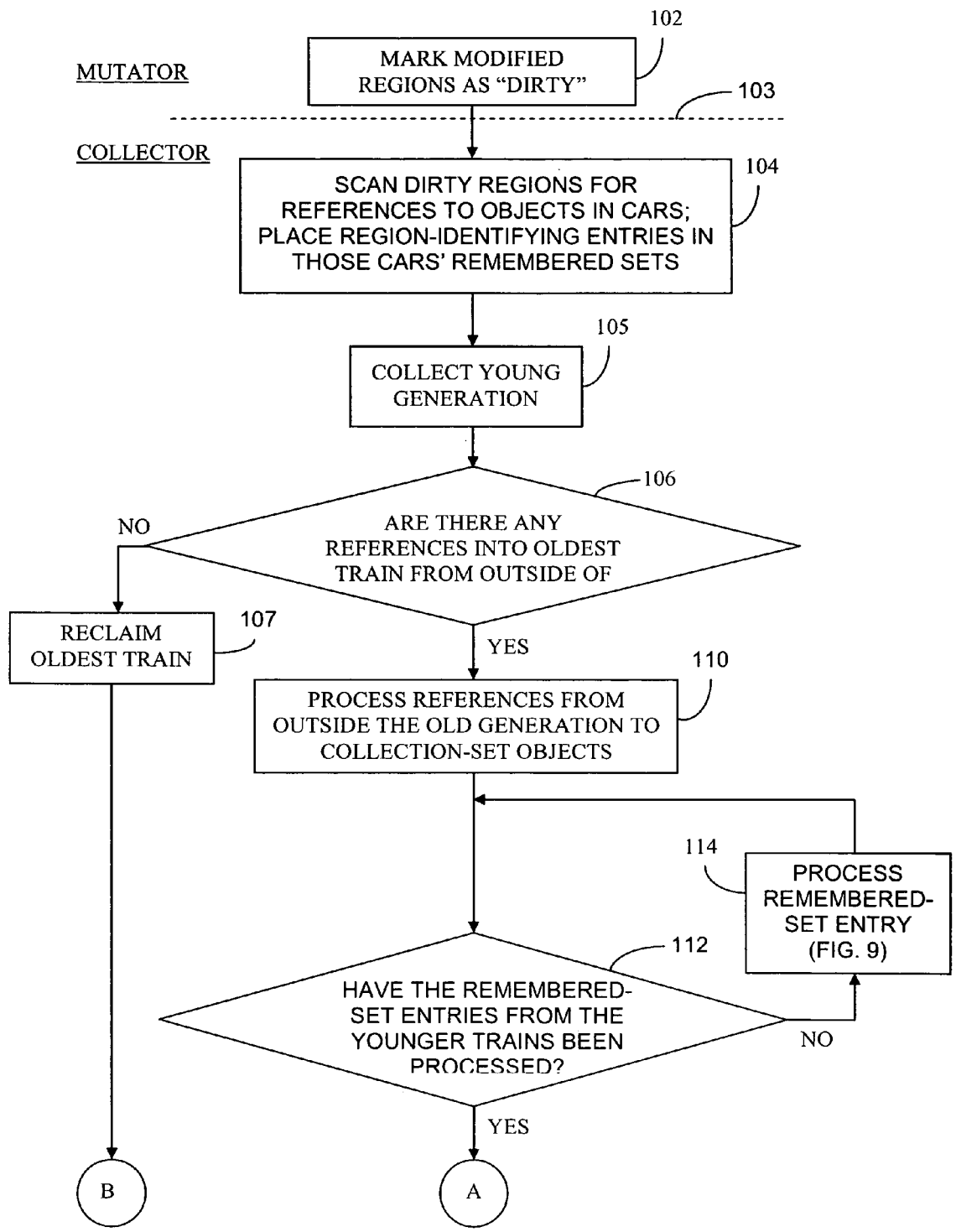
FIGS. 8A and 8B, discussed above, together constitute a flow chart that illustrates a garbage-collection interval that includes old-generation collection.
Figure 8B:
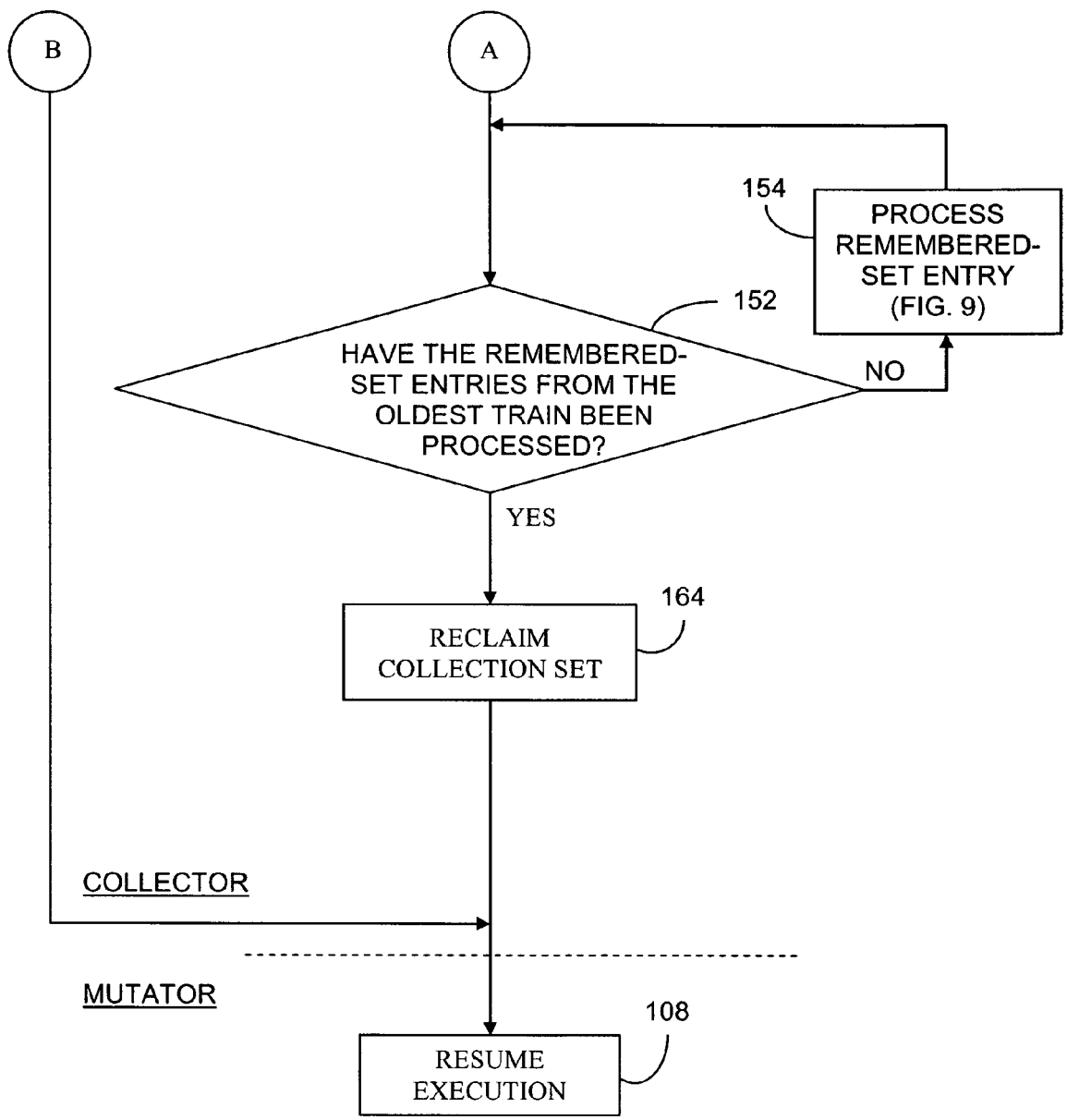
Figure 9:
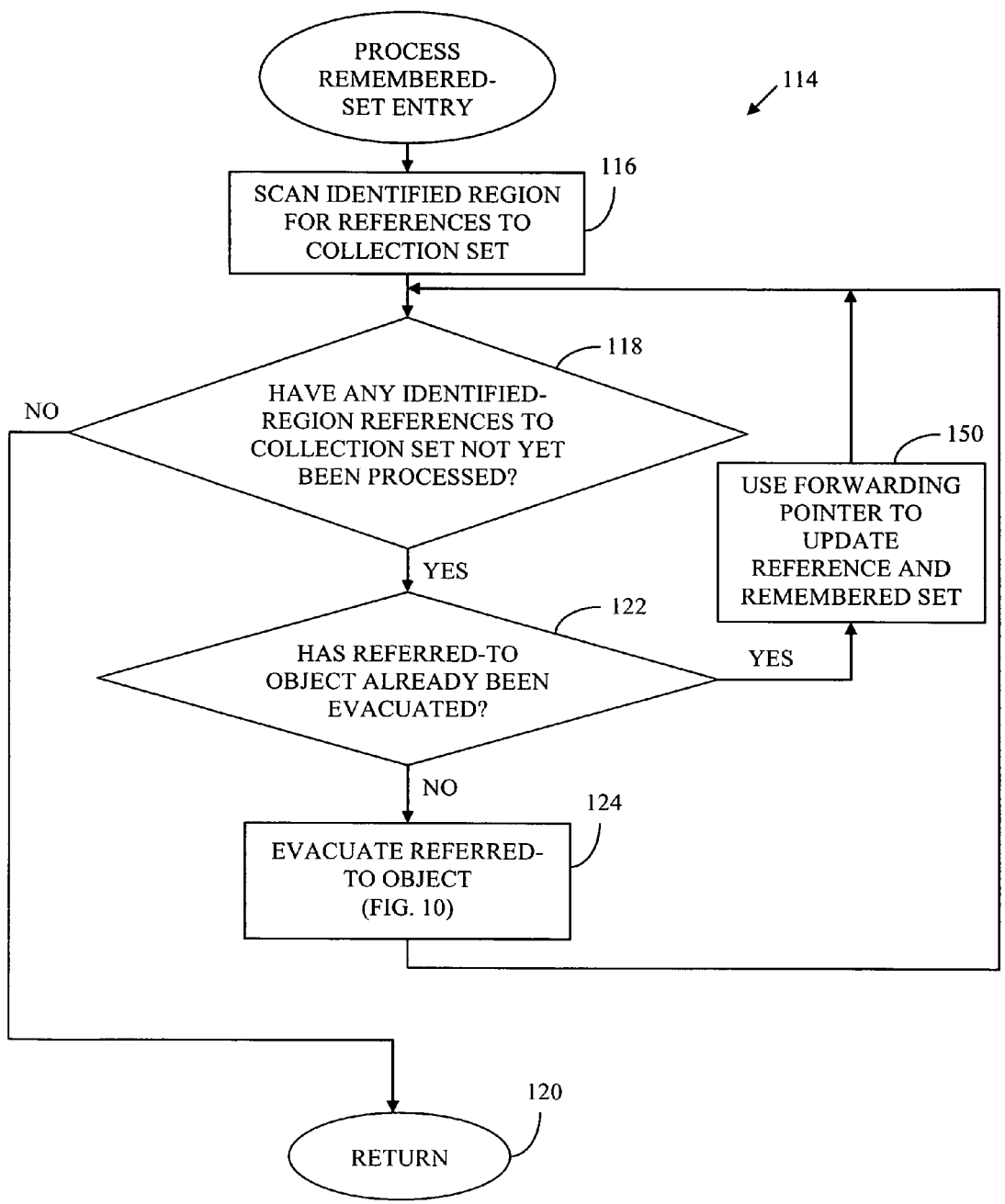
FIG. 9, discussed above, is a flow chart that illustrates in more detail the remembered-set processing included in FIG. 8A.
Figure 10:
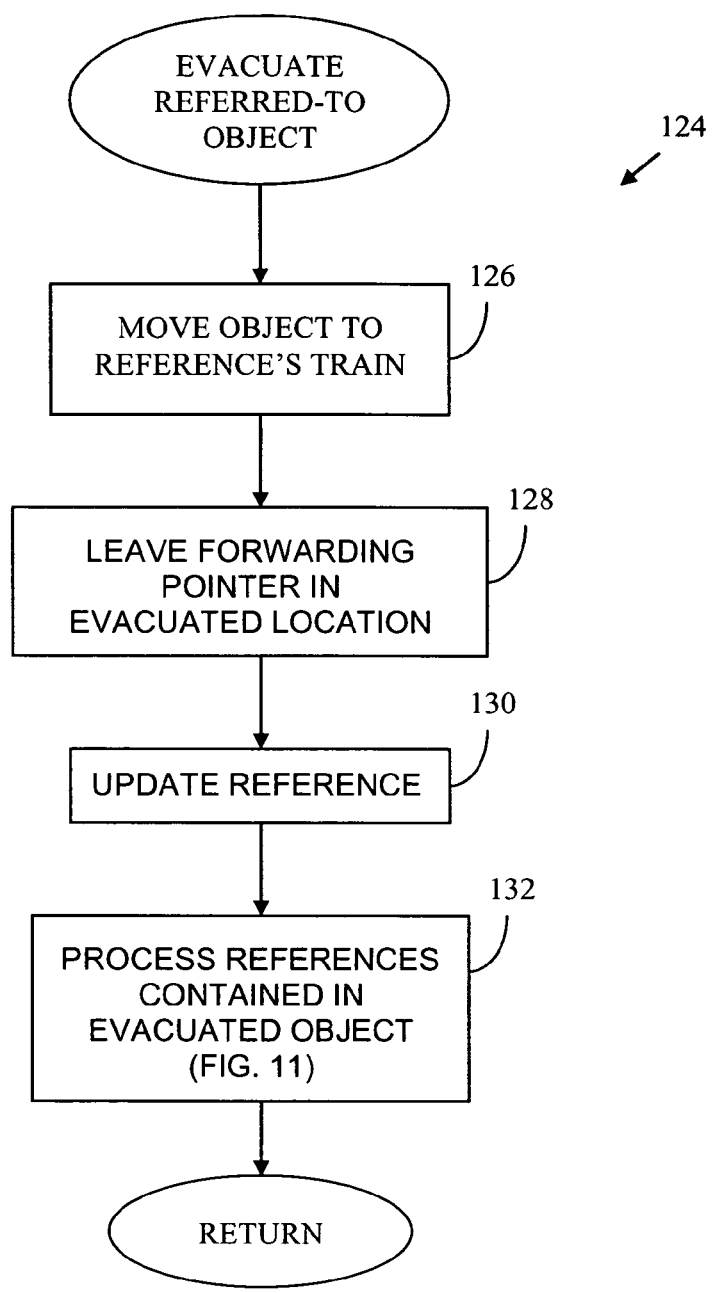
FIG. 10, discussed above, is a block diagram that illustrates in more detail the referred-to-object evacuation that FIG. 9 includes.
Figure 11A:
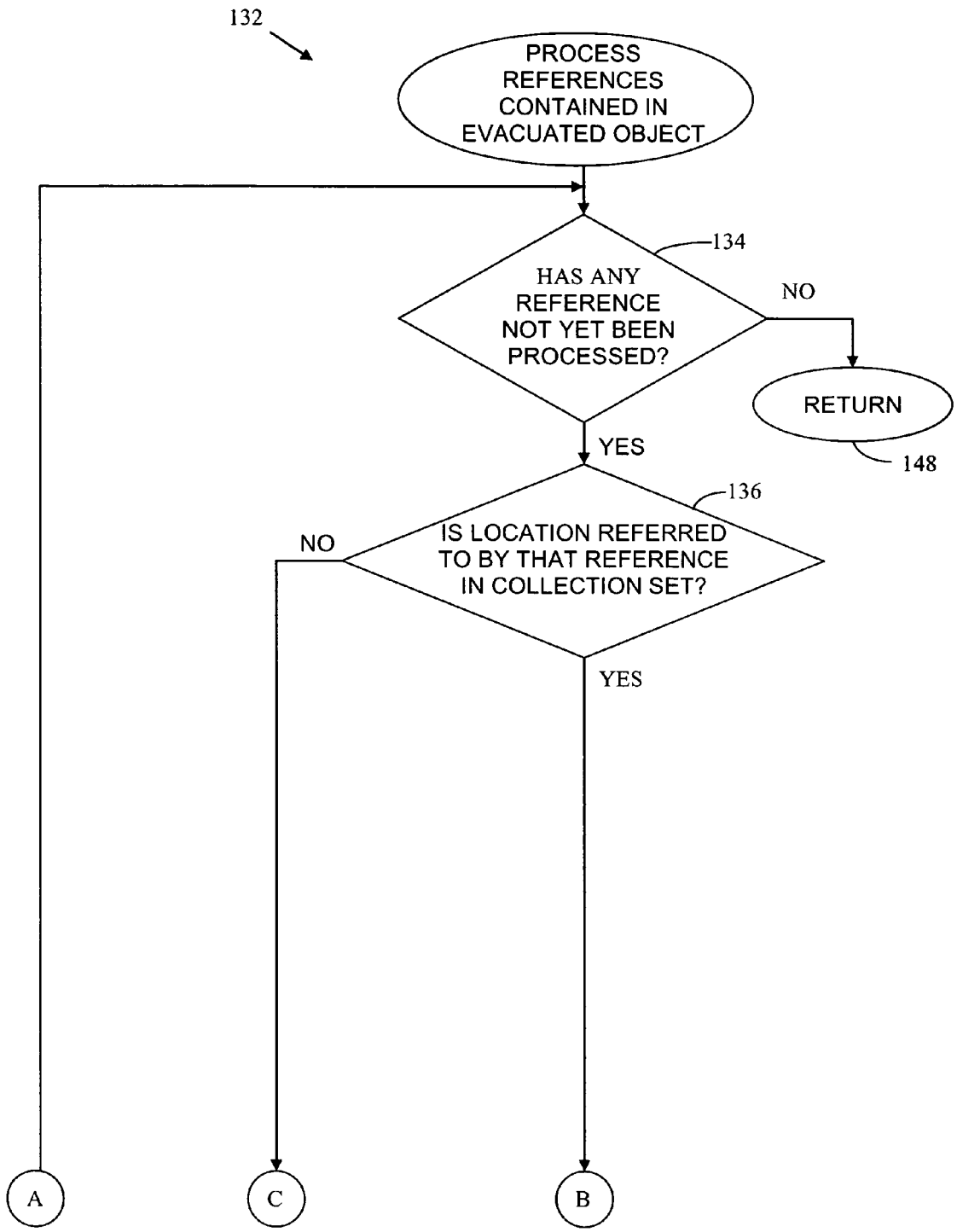
FIGS. 11A and 11B, discussed above, together form a flow chart that illustrates in more detail the FIG. 10 flow chart's step of processing evacuated objects' references.
Figure 11B:
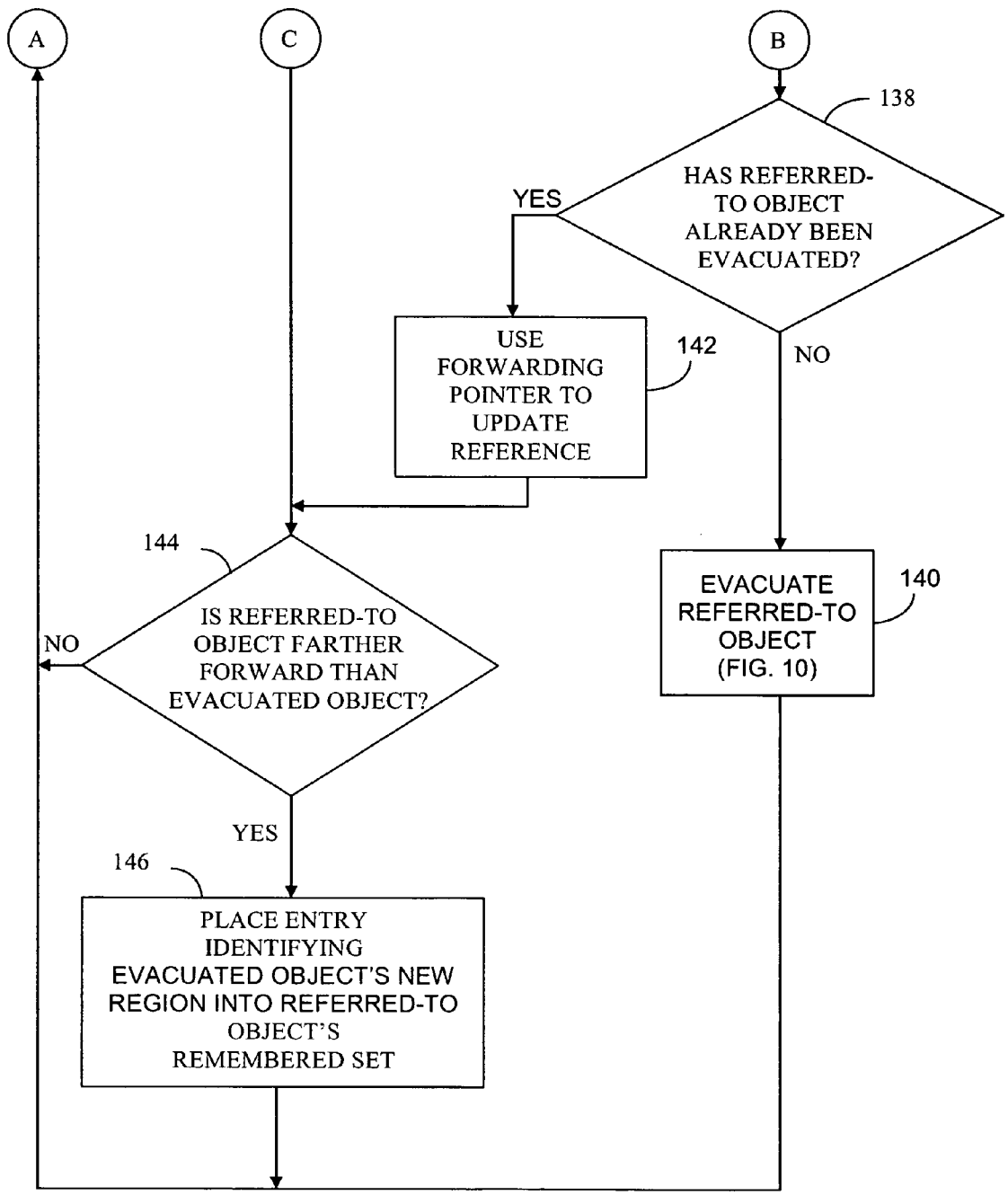
Figure 12A:
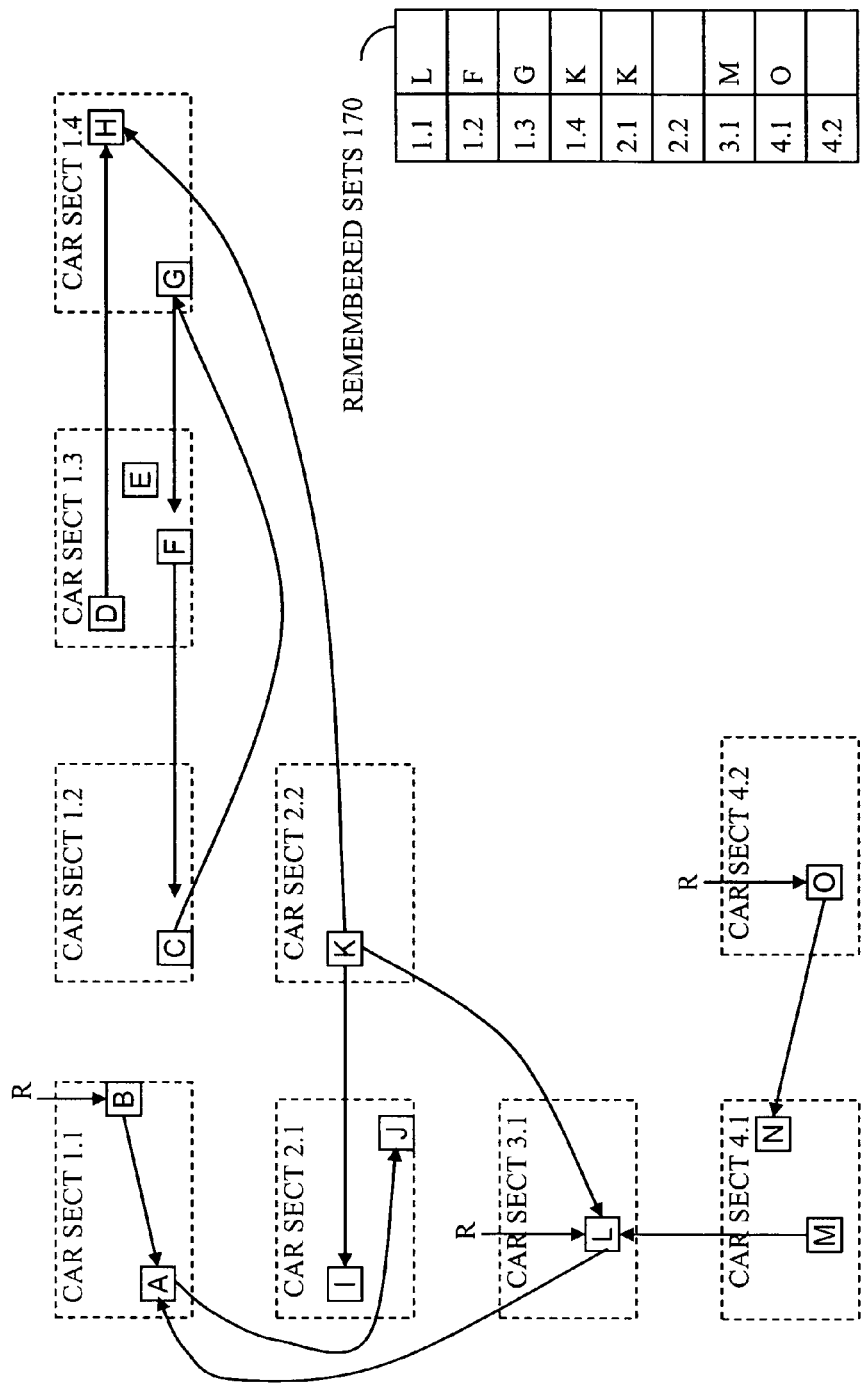
Figure 12B:
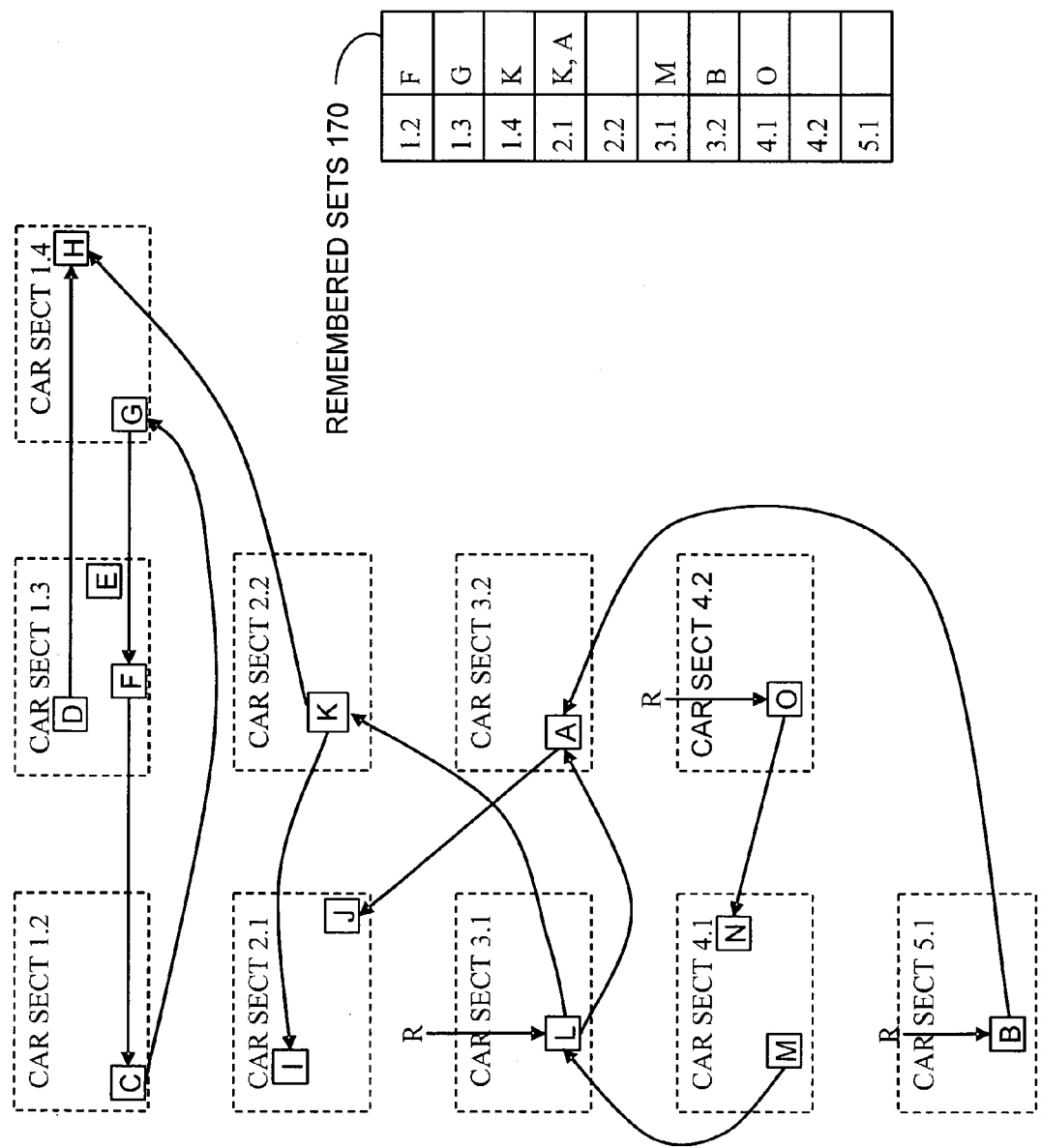
Figure 12C:
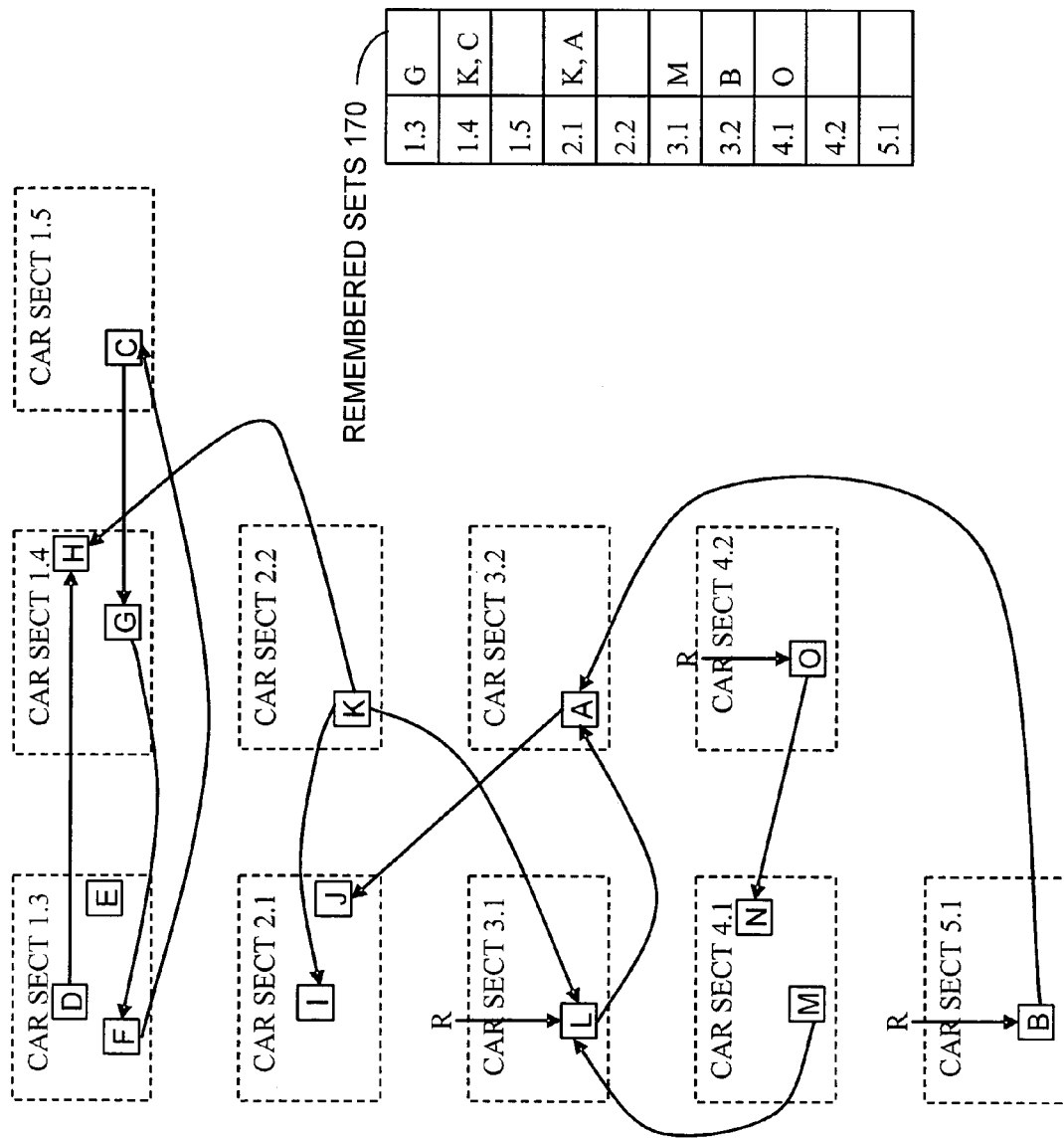
Figure 12D:
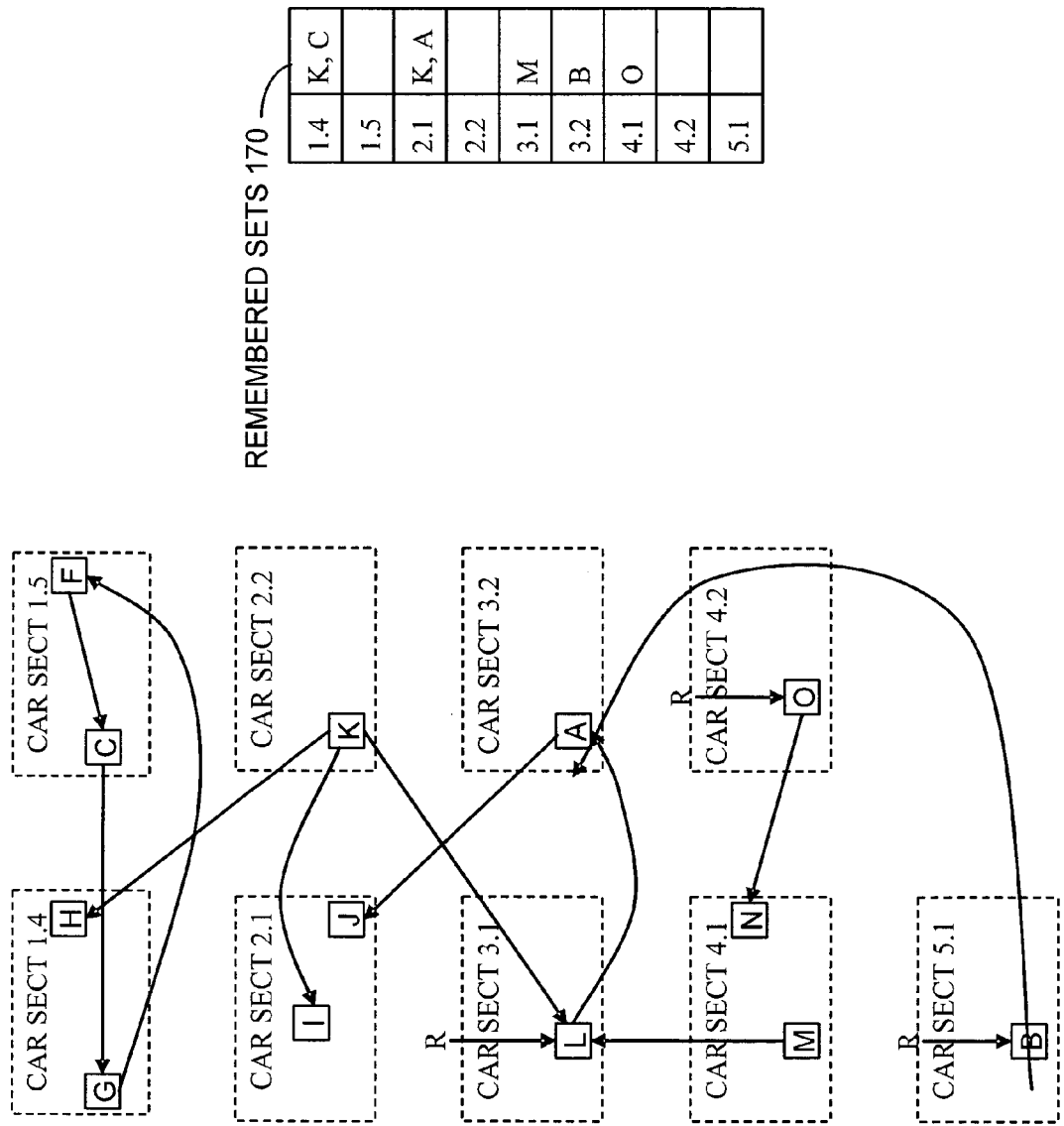
Figure 12E:
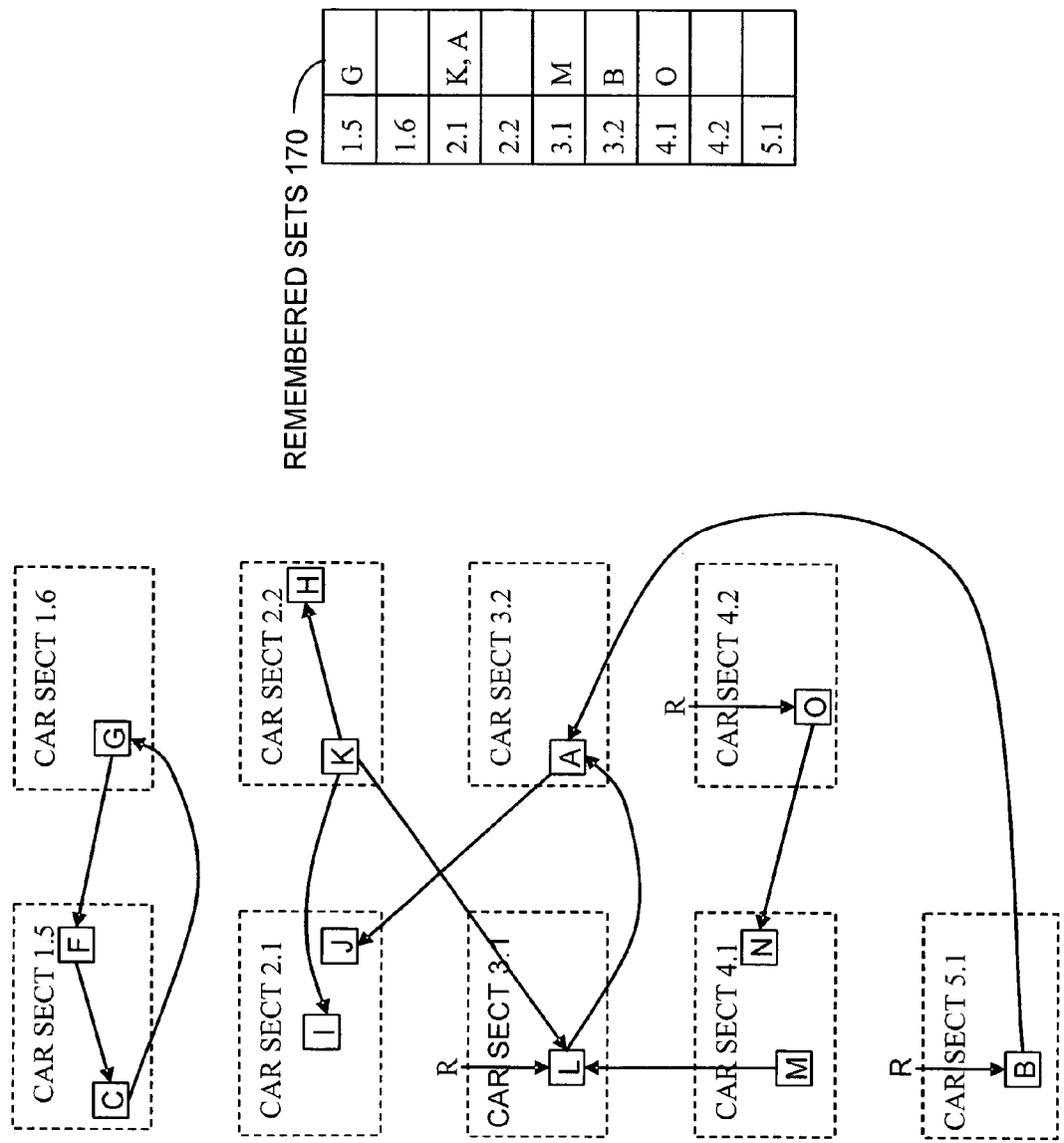
Figure 12F:
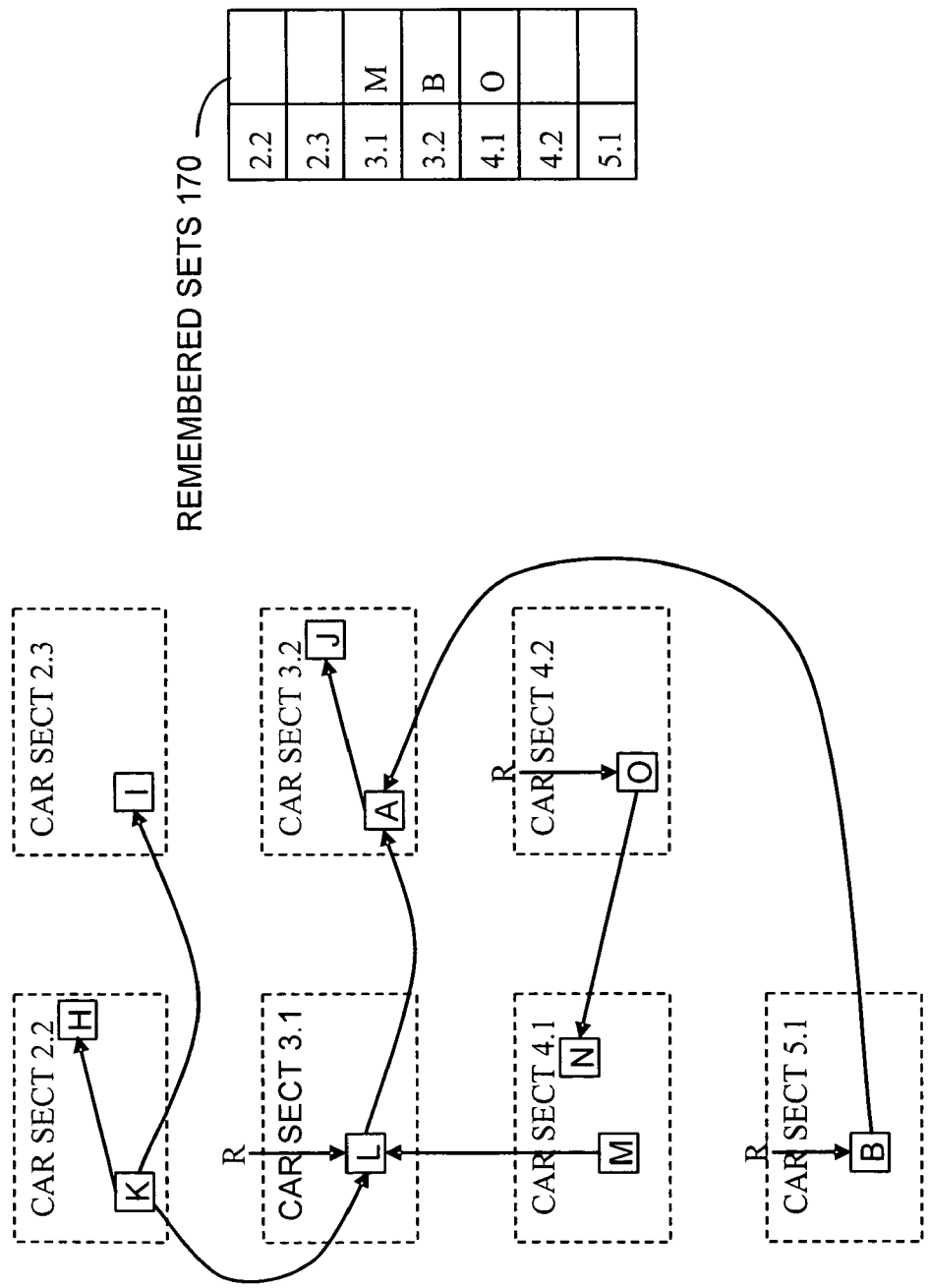
Figure 12G:
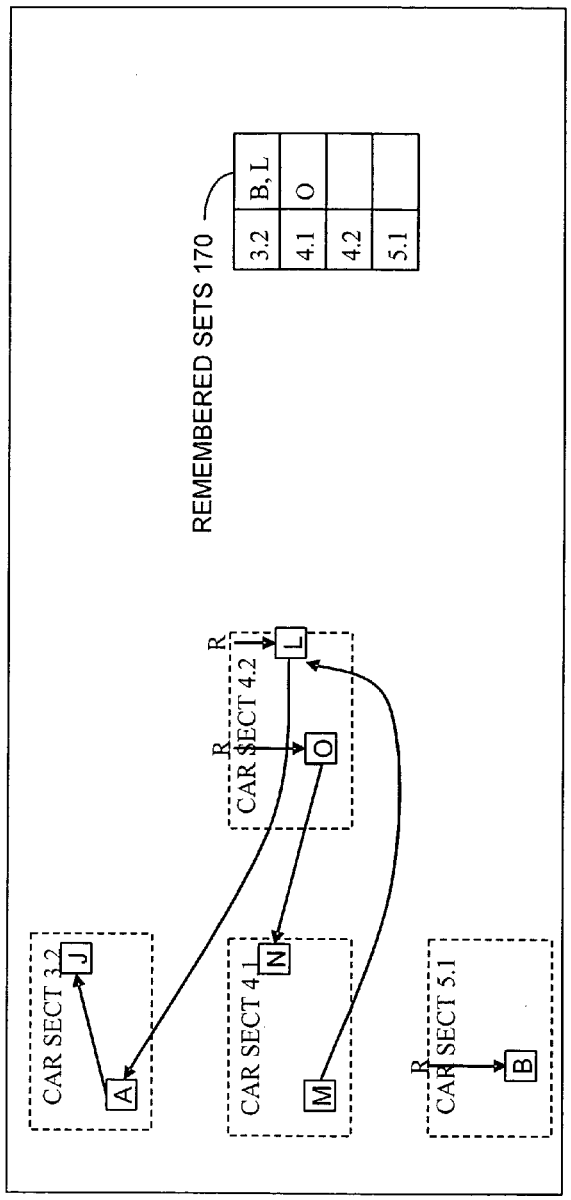
Figure 12H:
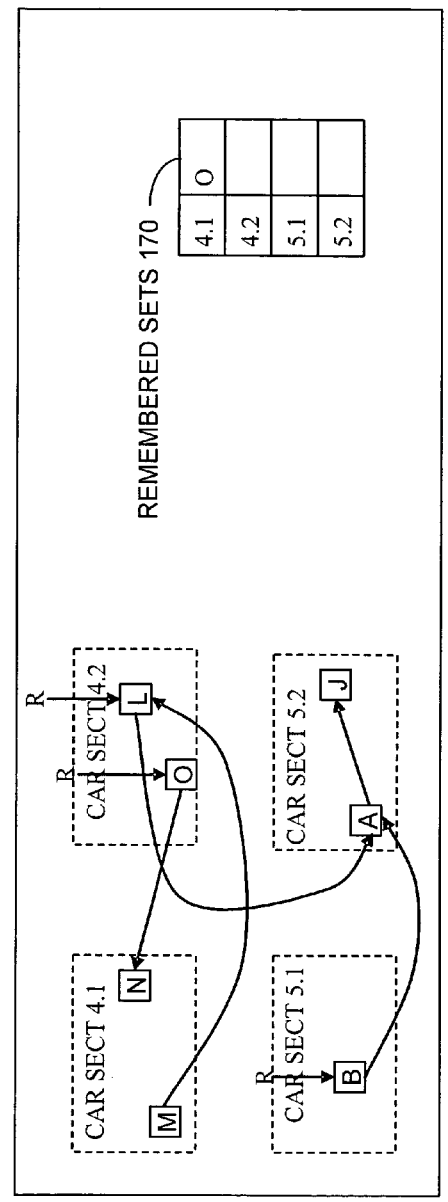

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. As will be explained below in more detail, though, one or more groups of existing trains may be combined into respective single trains during promotions from the young generation to the old generation that occur during the young-generation collection of block 178.

Also, for the sake of efficiency, the collection operation of FIG. 13 includes a step represented by block 180. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 182 and 184 indicate, it then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If not, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. As will be explained below, this may also present an opportunity to combine trains. When this process has been completed, the collection set can be reclaimed, as block 198 indicates, since no remaining object is referred to from outside the collection set: any remaining collection-set object is unreachable. The collector then relinquishes control to the mutator.

A convenient opportunity for determining whether a car should be advanced in the collection order presents itself when an entry is to be added to a remembered set. As was explained above, this occurs most often during the collector's summarization process, in which it begins an interval by inspecting "dirty" locations tagged by the mutator's write barriers. It also occurs when objects are being evacuated from a car being collected.

Figure 14:
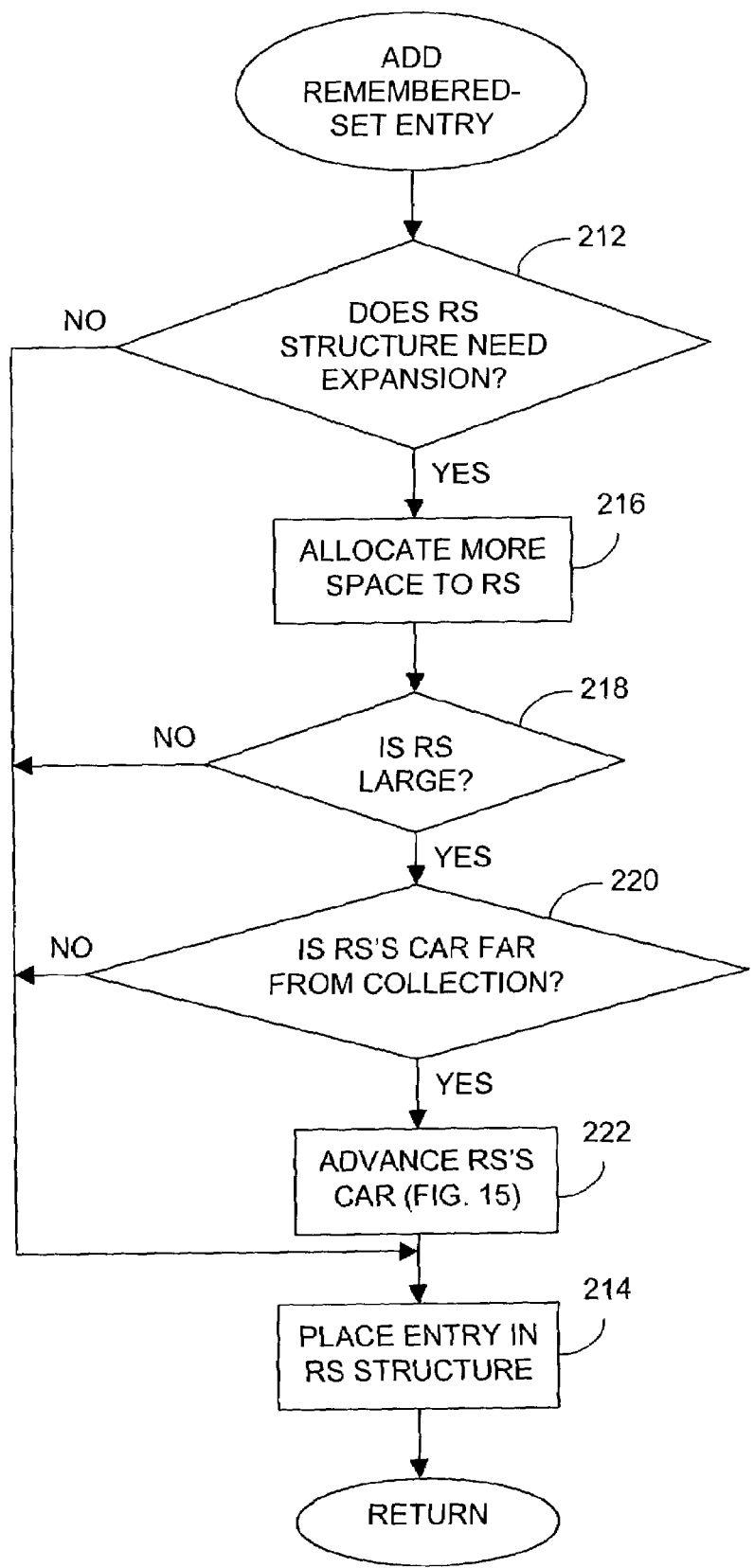
FIG. 14 is a flow chart that illustrates a routine for adding an entry to a car's remembered set.

FIG. 14 depicts in simplified form an example of a remembered-set-update routine that includes a car-advancement decision. In most instances, the test represented by block 212 yields a negative outcome: the memory space needed to contain the remembered set does not need to be expanded. In this normal case, the entry is simply placed in the remembered-set data structure, as block 214 indicates, and the operation is over.

Occasionally, though, the collector decides that the remembered-set data structure needs to be expanded or otherwise adjusted to memorialize more references' locations. In some cases, the test for whether such an adjustment is necessary is simply whether any more room is left in the memory space so far allocated to the remembered set. More typically, the remembered set is organized as a hash table to which the efficiency of entry addition falls off severely as the allocated space becomes nearly full. Collectors employing that type of remembered-set organization will typically decide to adjust the structure's capacity when the remembered-set data structure has been filled to some predetermined percentage of its capacity. Block 216 depicts the resultant adjustment as simply the allocation of more memory to the remembered set, but the collector may make some other adjustment instead, such as coarsening the granularity with which the entries specify reference-containing locations.

In any event, the illustrated embodiment uses the need for such an adjustment as a trigger for a car-advancement decision. As block 218 indicates, one factor in making this decision is the remembered set's size. The "size" used for this purpose may, e.g., be how much memory has been allocated to it, how many current entries it has, or how many times entries have been made in it. (If granularity coarsening has occurred, the latter two quantities are not necessarily the same.) Also, the threshold with which the size is compared in making this decision may be fixed, or it may vary with run-time quantities, such as the current number of live-object-containing cars and the car's "age," i.e., its current position in the collection order.

Although the car's age may be taken into account in determining whether the remembered set is too big, block 220 depicts age as a separate criterion, because an age criterion often will instead or additionally be imposed independently of the remembered set's size. If the car is already fairly close to collection, the benefit of advancing the car is not great. What constitutes being young enough to justify advancement ("aging") is a matter of design choice. Certainly, there is no value in advancing a car that already will be in the next collection set. And most embodiments will not advance a car if it is located in the oldest train. How many, say, older cars or bytes in them will otherwise be considered to indicate that the car is far enough back to justify advancement may be a fixed value, or it may vary in accordance with run-time conditions. In any event, a large-remembered-set car that, by some standard, is far enough back in the collection order will be advanced ahead of cars in front of it, as block 222 indicates.

For purposes of exposition, block 222 depicts a given car's advancement operation as occurring together with the remembered-set update that triggered it. And, indeed, some embodiments may adopt this approach. As will become apparent in connection with FIG. 15, though, it will probably be more efficient in most cases for the remembered-set-update operation not to advance the car but simply to mark it as needing advancement. The collector then can later perform certain of the advancement steps together for all cars that need to be advanced.

Figure 15:
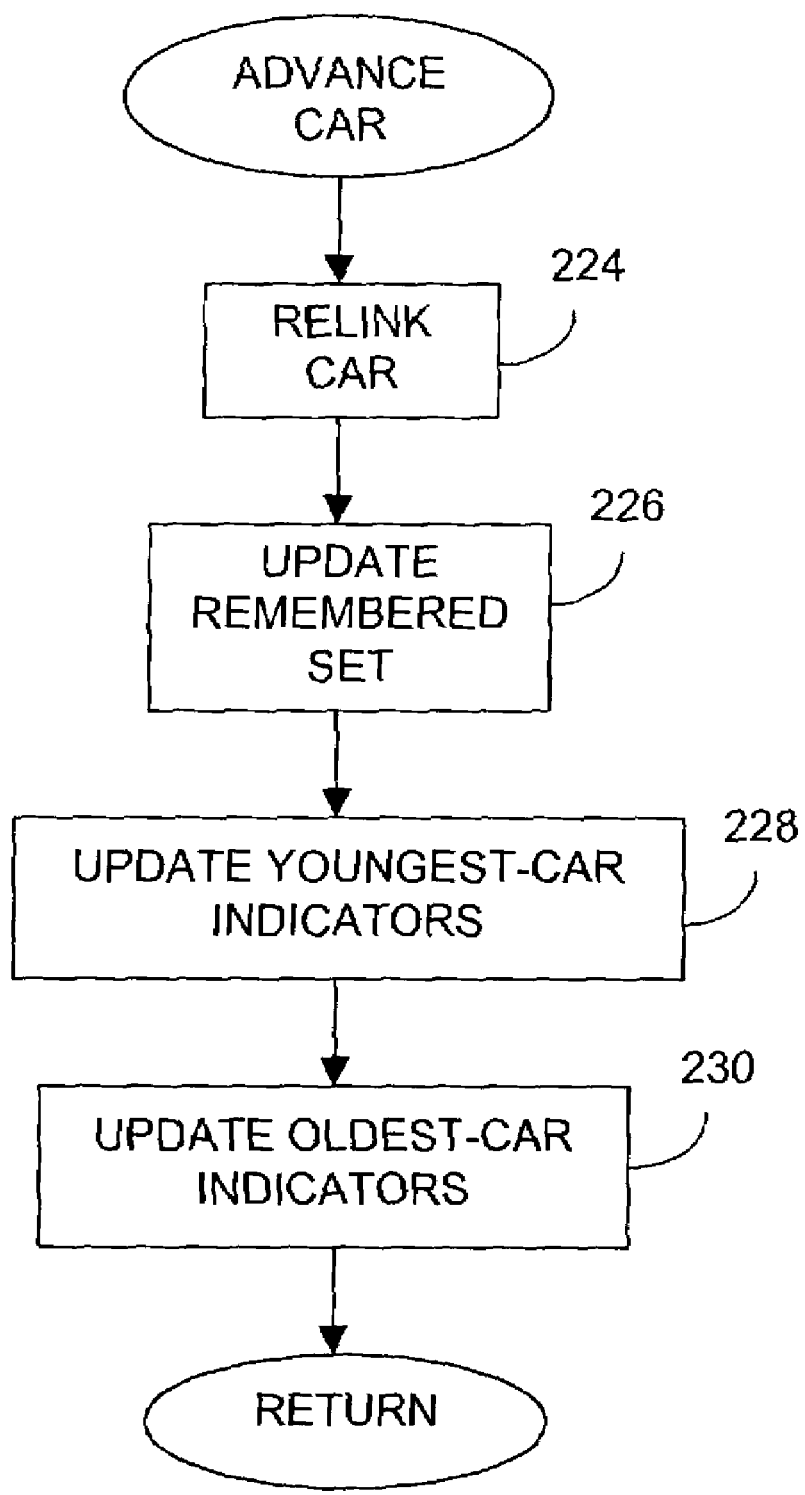
FIG. 15 is a flow chart that illustrates in more detail a car-advancement step that the routine of FIG. 14 includes.

The steps that FIG. 15 depicts include both actually advancing the car and updating various reference data to reflect the advance. The manner in which a car is actually advanced will be implementation-dependent. In most cases, a car's position in the collection order is indicated by the position of its car's metadata structure in a linked list of such structures. As block 224 indicates, therefore, advancing the car typically means relinking its metadata structure. If the metadata for the car include a number that represents the car's relative position in the collection order, that number will be updated, as will those of any cars for which the relinking makes this necessary.

Advancement may cause the advancing car to be placed ahead of cars that contain references into it. Since those references were previously located in cars ahead of the advanced car, the advanced car's remembered-set entries typically will not identify their locations. So something needs to be done to ensure that those references' locations are known when the advanced car reaches collection. The collector may therefore scan the passed cars for references into the advanced car, as block 226 indicates. But some implementations will simply make a notation against the advanced car to identify the cars that it has passed so that they can be scanned when the advanced car reaches the collection set—if those cars have not themselves been advanced ahead of the advanced car in the interim.

Further updates are necessary if the collector maintains youngest- and/or oldest-car indicators for respective cars. A given car's youngest-car indicator will represent the youngest car that can possibly contain a reference into the given car; that is, the collector has inferred from its monitoring of reference writing that no younger car contains a reference into the given car. The oldest-car indicator represents a similar limit: there is no possibility that a reference to the given car is located in a car older than the one identified by the oldest-car indicator.

To maintain the accuracy of these indicators, the collector inspects each car's youngest-car indicator, because the new position of the advanced car may have made that indicator's value erroneous. To correct the erroneous indicator value, the collector may scan the car's remembered set to identify what is now the youngest car containing a reference into that car. More typically, though, it will simply update the youngest-car indicator to identify the car immediately forward of the advanced car's previous position in the collection order, even though that car may have no reference to an object in the advanced car. The youngest-car indicator will nonetheless be accurate in the sense that no car younger than the car identified by the youngest-car indicator will contain a reference into that indicator's car.

As block 230 indicates, the collector may additionally need to update oldest-car indicators. One, relatively expensive way to do so includes first scanning the advanced car for references into other cars. For each reference-containing car thus identified, the collector determines whether that car's oldest-car indicator identifies a car younger than the advanced car. If so, the youngest-car indicator is updated to identify the advanced car. A less-expensive approach omits the step of scanning the advanced car and instead updates more oldest-car indicators to identify the advanced car. Specifically, it thus updates every oldest-car indicator whose current value identifies a car that is both (1) at least as old as the advanced car's previous position and (2) younger than its new position.

In some collectors, this operation of updating oldest-car indicators may include updating the advanced car's oldest-car indicator. Although advancing the car does not change the identity of the oldest car that contains a reference into it, an update may nonetheless be necessary if advancing the car moves it from a position behind that oldest car to a position ahead of it. This necessity will arise in collectors that do not permit a given car's oldest-car indicator to identify a car younger than the given car. In such collectors, a car that advances beyond the one identified by its oldest-car indicator will have to have its oldest-car indicator set to a value whose meaning is simply that no older car contains a reference to an object in the advanced car. In some embodiments, the value that indicates this may be a fixed distinguished value such as NULL, but it preferably is a value that identifies the indicator's car itself.

Other adjustments, not depicted in the drawings, may be necessary in some embodiments. For example, some collectors may provide a type of oldest-car indicator that is associated not with a given car but rather with a given card in the card table. Such indicators identify respective cars, and they stand for the fact that the cards with which they are associated contain no references to objects in cars younger than the cars they identify.

Now, it will very often be worth while to advance a given car by quite a distance. But it is apparent from the previous discussion that the amount of updating required by such advancement can be considerable and will tend to increase with the distance through which a car is advanced. Moreover, the state in which the car-advancement operation leaves the system at any point when new remembered-set-entry insertion is to occur has to be consistent for some definite position of the advanced car within the collection queue. So it may be unacceptable in many circumstances to perform all of the updates required for a desired-distance advancement between points in the collection activity in which remembered-set-entry insertions are to occur. For this reason, the desired advancement may be performed incrementally: the collector may advance the car only a relatively small number of cars between consistent states.

For example, the collector may perform enough advancement activity at the beginning of each collection cycle to advance a car a small distance and leave the collector in a consistent state before card tables are scanned to make remembered-set-entry insertions. Another possibility is to perform a similar amount of activity at the end of each collection cycle, when the collector has a better idea of how much advancement activity can be done without making the resultant total collector interval exceed a given pause time. Even better is to have respective threads dedicated to each car to be advanced and to allow them to execute concurrently with the mutator, performing their tasks opportunistically by bringing the car's collection-queue positions to consistent states before remembered-set-entry insertions are to occur. There are some applications in which such opportunistic advancement will exact essentially no performance cost.

The incremental advancements will typically be repeated until the car has reached a point in the queue designated by the collector's design criteria to afford the best compromise between cost and benefit. The precise policy employed in this regard will be implementation-dependent, and the particular strategy for selecting the final advancement location is not critical. One strategy, for example, is simply to advance a car to the head of the existing train immediately behind the oldest train. Preferably, that train will be one that has been added to receive cars thus advanced. By thereby avoiding trains that have been populated by evacuation, the car-advancement operation is less likely to prevent reclamation of a train that otherwise contains only garbage.

In implementations that maintain oldest-car indicators for respective cars, another possibility is to stop the advancement short of the position immediately behind the oldest train if the oldest-car indicator of the car being advanced specifies a younger position. Such implementations may stop the car's advancement in the position immediately ahead of the car that the advancing car's oldest-car indicator specifies. When the car has been advanced to that position, the collector will know that its remembered set includes entries for all same-generation references to objects in the car being advanced. So that car can be placed in the collection set without further updates of its remembered set or further disturbance of the collector data associated with other cars. Not only does thus stopping short of the farther-forward position save further advancement work but it also leaves other cars' youngest- and oldest-car indicators with values that are nearer their optimum values.

Having completed the car-advancement process, the collector makes the appropriate remembered-set entry, as FIG. 14's block 214 indicates, and the remembered-set-entry operation is complete.

The steps depicted in FIGS. 14 and 15 do not need to be performed in the illustrated order. In particular, the actual operation of placing the entry in the remembered-set data structure, which block 214 represents, can be performed at essentially any point in the process. As was mentioned above, moreover, the operations of relinking the car and updating youngest- and oldest-car indicators and the advanced car's remembered set need not be performed as part of the process of making the remembered-set entry. If the operation of scanning for youngest- and oldest-car indicators made stale by car advancement is postponed until all remembered-set entries have been made for a given collection interval, for example, savings can be realized by performing that operation in common for all car advancements at the same time.

As will now be explained, a car's actual position in the collection sequence can be changed without employing the above-described approach of advancing its nominal position. To appreciate this, consider FIG. 16, which shows in simplified form a typical structure 232 for containing the metadata representing a car. Such a structure will typically include a pointer 234 to the car section that those metadata manage, and it will also typically include a pointer 236 to the location in that car section where new objects can be allocated. It may also have data that indicate the car section's size. This may take the form of a pointer 238 to the end of the car section, for example.

It will additionally provide some way of identifying the train to which the car section belongs. For instance, it may include a pointer 240 to a metadata structure 242 representing the train. Pointers 244 and 246 may be provided to link the car sections into the sequence of that train's car sections. For the sake of convenience, the car structure may additionally include a field 248 that gives the car number established by that linkage. Fields such as those four give the car's nominal position in the collection sequence. As was mentioned above, moreover, the car may be provided with oldest- and youngest-car indicators 250 and 252, whose values may depend on the car's position in the collection sequence as well as on the positions of other cars. Everything else being equal, the nominal position thus indicated determines the order in which cars are collected.

But other factors can effect the actual collection order. As was mentioned above, all cars in a train may be collected without specific remembered-set processing and evacuation if the collector determines that no references located outside that train refer to objects within it. Conventionally, such whole-train collection is performed only on the oldest train. But some train-algorithm implementations may additionally perform the train test on younger trains in such a manner that younger trains' cars are sometimes collected before older trains. Indeed, some implementations may perform similar tests for individual cars rather than just for trains, and this, too, will result in out-of-sequence collection. In all of these examples, collection for cars that require no evacuation is advanced without advancement of their nominal positions in the collection sequence.

But actual advancement without nominal advancement can be performed even for cars where collection will require some evacuation. To appreciate this alternate approach, first consider the operations with which it can dispense. If a car's nominal position is not to be changed, the collector can omit the relinking operation represented by FIG. 15's block 224: the metadata exemplified by FIG. 16's linking pointers 244 and 246, its train pointer 240, and its car-number field 248 require no change. Nor does the advanced car's oldest- or youngest-car indicator or those of other cars: the steps represented by FIG. 15's blocks 228 and 230 will be unnecessary. The only FIG. 15 step required is the one that block 226 represents: the car's remembered set needs to be supplemented in order to list references from older cars that may remain uncollected when the advanced car is collected out of turn.

Figure 16:
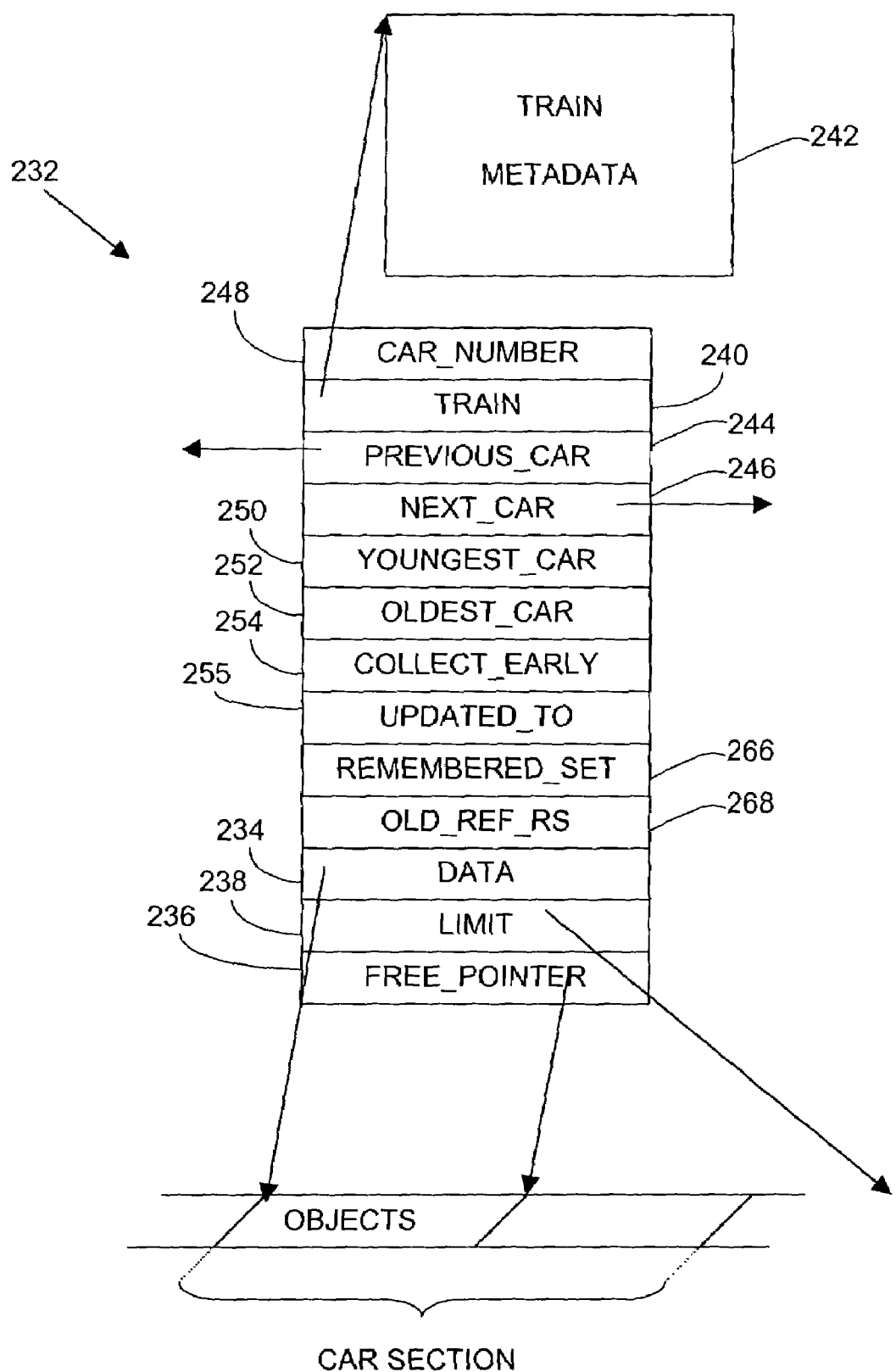
FIG. 16 is a data-structure diagram employed to describe a car's nominal position in the collection sequence.

In addition to thus supplementing the remembered set, a typical collector employing the alternate approach would, without changing the nominal position of the car to be advanced, mark the car in some fashion simply to indicate that it should be collected out of turn. FIG. 16 represents this by a simple Boolean field 254. By means not shown, the car typically would also be placed in a list of cars designated for early collection. And, since the initial remembered-set expansion would typically not be completed within a single collection increment, there may be some field 255 to indicate how far the initial remembered-set expansion had advanced.

Figure 17:
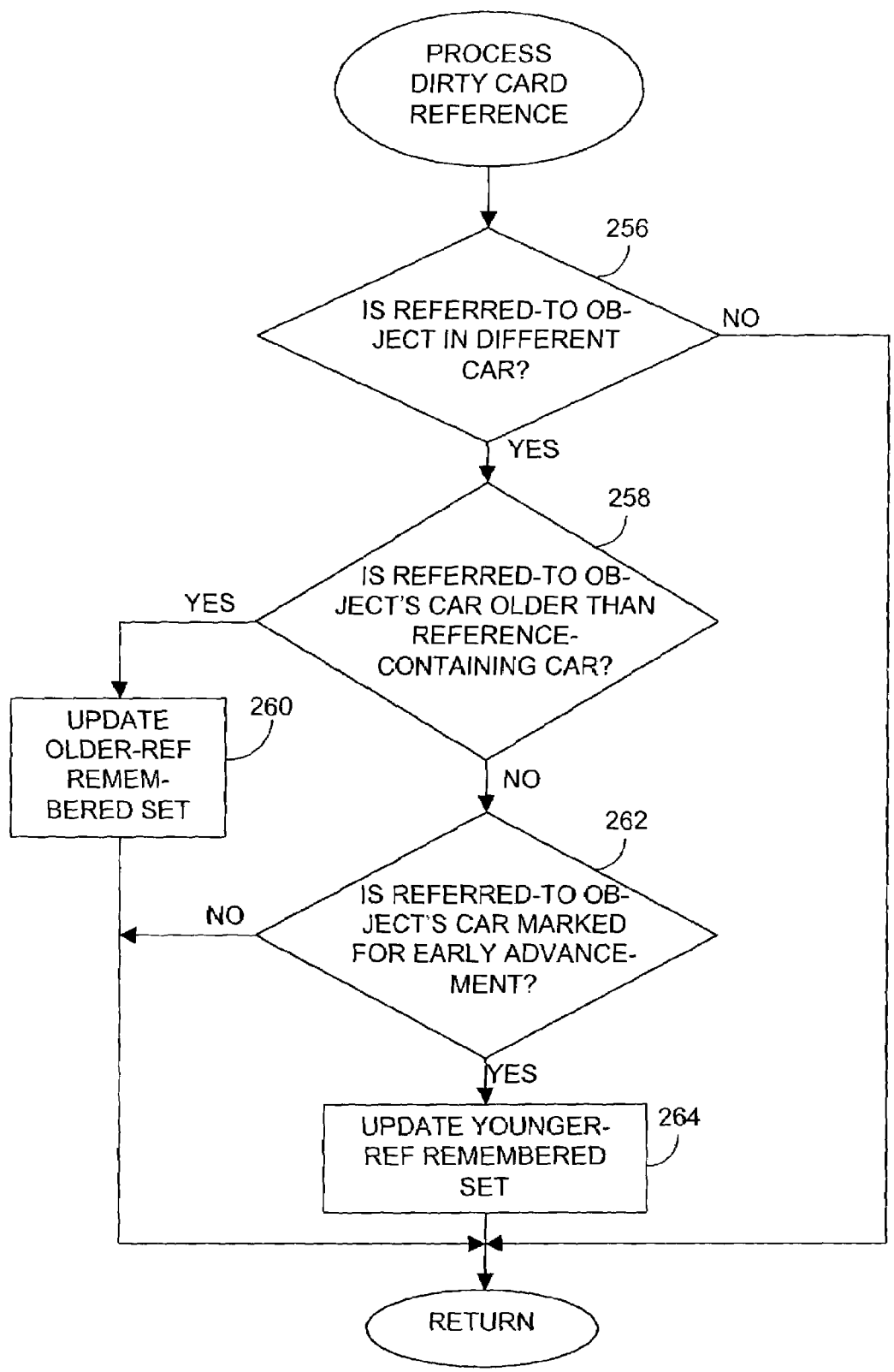
FIG. 17 is a flow chart that illustrates a routine for memorializing a reference found in a dirty card in a system in which cars are advanced in the collection order without having their nominal collection-order positions advanced.

As was explained above, one of the advantages of the alternative approach is that designating a car for early advancement without changing its nominal position avoids the need to update other cars' youngest- and oldest-car indicators. This not only saves time but also increases those indicators' accuracy. And it makes this alternative approach particularly compelling for collectors that use oldest-car indicators. Such collectors may detect "dead" cars by using the youngest- and oldest-car indicators to bracket the range of cars from which a car's objects are referred. The narrower this range is, the more likely a car is to be recognized as dead. When a car is advanced in nominal position, the ranges defined by all cars whose oldest-car indicators identify it expand undesirably, and they typically remain thus expanded after the advanced car is collected. A collector can avoid this effect by advancing a car's collection without advancing of its nominal position. FIG. 17 shows, this advantage comes only at the expense of some complication in remembered-set updating. The operation of processing the references that dirty-card scanning has identified would typically begin as usual with a determination of whether the referred-to object is in a car different from the one in which the reference is located. FIG. 17's block 256 represents making this determination. As usual, no remembered-set entry needs to be made for a reference located in the same car as the referred-to object.

In most implementations of the train algorithm, an entry needs to be made in the remembered set associated with the referred-to object's car only if that car is older than the one in which the reference is located. Block 258 represents determining whether it is, and block 260 represents making the necessary entry if the result of that determination is affirmative. Usually, the remembered-set entry will be made only if doing so does not involve duplication, of course. Additionally, although the drawing does not indicate this, a collector that maintains oldest- and youngest-car indicators would perform any indicator updating necessitated by the new entry.

Conventionally, the collector would make no remembered-set entry if the block 258 determination's outcome is negative. So the reference-processing routine would conventionally just return at that point. In this alternative approach, though, a car may have been designated for early collection without having being advanced in the nominal collection sequence. So the collector needs to make a further test, which block 262 represents. In this test, the collector determines whether the referred-to object's car has been marked for early collection. If it has, the remembered set may need to be updated, as block 264 indicates, even though the reference's car is older than the referred-to object's.

In this simple example, the collector will ensure that an identifier of the reference's location is included in the remembered set associated with the referred-to object's car in any case in which that car has been marked for early collection. In some implementations, though, the collector may forgo that remembered-set updating if it has been established that the car, although marked for early collection, will not be collected as soon as the car in which the reference is located.

FIG. 17 employs two different blocks 260 and 264 to represent the remembered-set-updating operation. This is because, as FIG. 16 suggests by separate pointers 266 and 268 to different remembered-set structures, the remembered-set structures employed by some embodiments to record the locations of references in older cars may be different from those that they use to record the locations of references in younger cars.

Such separate structures are not necessary, of course, but using them can yield improvements in memory usage and remembered-set-processing efficiency. Specifically, a remembered-set entry in some implementations may, rather than simply specifying the location of a respective individual reference, designate a region large enough to contain more than one reference. In such embodiments, a granularity indicator associated with a remembered-set structure will specify a common granularity for all that structure's entries. Since a feature of the train algorithm is that references to objects in a given car are likely to populate older cars more densely than they do younger cars, it may be preferable for the granularity of the structure that records reference locations in older cars to be coarser than that of the structure used to record reference locations in younger cars.

Selectively advancing cars can significantly reduce the memory cost of remembered-set maintenance. The present invention therefore constitutes a significant advance in the art.

What is claimed is:

1. For performing garbage collection, a method comprising:
   A) providing a computer system that includes memory;
   B) configuring the computer system to act as a garbage collector that:
      i) treats at least a portion of a garbage-collected heap in the computer system's memory as divided into car sections;
      ii) searches the car sections for references;
      iii) maintains for each car section a remembered set associated therewith that contains entries representing locations where references have thereby been detected that refer to objects located in that car section;
      iv) imposes upon the car sections a collection order from older to younger;
      v) determines whether a given car section satisfies a set of at least one advancement criterion;
      vi) when a given car section satisfies a set of at least one advancement criterion, advances the given car section in the collection order; and
      vii) collects the car sections in increments in which the garbage collector uses the remembered sets to identify reachable objects and reclaims memory occupied by objects not identified as reachable; and
   C) employing the computer system to execute the garbage collector.

2. A method as defined in claim 1 wherein: D) the car sections are organized into trains on which the collection order is imposed; E) the collector collects the cars in accordance with the train algorithm; and F) car sections that are not in the oldest train are sometimes advanced in the collection order.

3. A method as defined in claim 1 wherein:
   D) the garbage collector maintains for each car section metadata associated therewith that give that car section's nominal position in the collection order; and
   E) the advancing of the given car section does not include updating the metadata associated therewith to change the car section's nominal position in the collection order.

4. A method as defined in claim 3 wherein:
   F) the remembered sets associated with car sections that have not been advanced in the collection order contain entries only for references located in younger cars; and
   G) the remembered set associated with a car section that has been advanced ahead of other car sections additionally includes entries for any references in those other car sections that refer to objects in the advanced car.

5. A method as defined in claim 4 wherein, for at least one car section that has been advanced in the collection order:
   H) the remembered set associated therewith is stored in a plurality of remembered-set structures; and
   I) each of that advanced car section's remembered-set entries for references located in car sections older than that advanced car section is stored in a remembered-set structure separate from the remembered-set structure in which any entry is stored for a reference located in a car section older than that advanced car section.

6. A method as defined in claim 1 wherein:
   D) the garbage collector maintains for each car section metadata associated therewith that give that car section's nominal position in the collection order; and
   E) the advancing of the given car section includes updating the metadata associated therewith to change the car section's nominal position in the collection order.

7. A method as defined in claim 1 wherein one advancement criterion in the set of at least one advancement criterion is that the size of the remembered set associated with the given car exceed a remembered-set size limit.

8. A method as defined in claim 1 wherein one advancement criterion in the set of at least one advancement criterion is that the number of entries in the remembered set associated with the given car exceed an entry limit.

9. A computer system comprising:
   A) processor circuitry operable to execute processor instructions; and
   B) memory circuitry, to which the processor circuitry is responsive, that contains processor instructions readable by the processor circuitry to configure the computer system as a garbage collector that:
      i) treats at least a portion of a garbage-collected heap in the computer system's memory as divided into car sections;
      ii) searches the car sections for references;
      iii) maintains for each car section a remembered set associated therewith that contains entries representing locations where references have thereby been detected that refer to objects located in that car section;
      iv) imposes upon the car sections a collection order from older to younger;
      v) determines whether a given car section satisfies a set of at least one advancement criterion;
      vi) when a given car section satisfies a set of at least one advancement criterion, advances the given car section in the collection order; and
      vii) collects the car sections in increments in which the garbage collector uses the remembered sets to identify reachable objects and reclaims memory occupied by objects not identified as reachable.

10. A computer system as defined in claim 9 wherein:
    C) the car sections are organized into trains on which the collection order is imposed;
    D) the collector collects the cars in accordance with the train algorithm; and
    E) car sections that are not in the oldest train are sometimes advanced in the collection order.

11. A computer system as defined in claim 9 wherein:
    C) the garbage collector maintains for each car section metadata associated therewith that give that car section's nominal position in the collection order; and D) the advancing of the given car section does not include updating the metadata associated therewith to change the car section's nominal position in the collection order.

12. A computer system as defined in claim 11 wherein:
E) the remembered sets associated with car sections that have not been advanced in the collection order contain entries only for references located in younger cars; and
F) the remembered set associated with a car section that has been advanced ahead of other car sections additionally includes entries for any references in those other car sections that refer to objects in the advanced car.

13. A computer system as defined in claim 12 wherein, for at least one car section that has been advanced in the collection order:
G) the remembered set associated therewith is stored in a plurality of remembered-set structures; and
H) each of that advanced car section's remembered-set entries for references located in car sections older than that advanced car section is stored in a remembered-set structure separate from the remembered-set structure in which any entry is stored for a reference located in a car section older than that advanced car section.

14. A computer system as defined in claim 9 wherein:
D) the garbage collector maintains for each car section metadata associated therewith that give that car section's nominal position in the collection order; and
E) the advancing of the given car section includes updating the metadata associated therewith to change the car section's nominal position in the collection order.

15. A computer system as defined in claim 9 wherein one advancement criterion in the set of at least one advancement criterion is that the size of the remembered set associated with the given car exceed a remembered-set size limit.

16. A computer system as defined in claim 9 wherein one advancement criterion in the set of at least one advancement criterion is that the number of entries in the remembered set associated with the given car exceed an entry limit.

17. A storage medium containing instructions readable by a computer to configure the computer to operate as a garbage collector that:
A) treats at least a portion of a garbage-collected heap in the computer system's memory as divided into car sections;
B) searches the car sections for references;
C) maintains for each car section a remembered set associated therewith that contains entries representing locations where references have thereby been detected that refer to objects located in that car section;
D) imposes upon the car sections a collection order from older to younger;
E) determines whether a given car section satisfies a set of at least one advancement criterion;
F) when a given car section satisfies a set of at least one advancement criterion, advances the given car section in the collection order; and
G) collects the car sections in increments in which the garbage collector uses the remembered sets to identify reachable objects and reclaims memory occupied by objects not identified as reachable.

18. A storage medium as defined in claim 17 wherein:
H) the car sections are organized into trains on which the collection order is imposed;
I) the collector collects the cars in accordance with the train algorithm; and
J) car sections that are not in the oldest train are sometimes advanced in the collection order.

19. A storage medium as defined in claim 17 wherein:
H) the garbage collector maintains for each car section metadata associated therewith that give that car section's nominal position in the collection order; and
I) the advancing of the given car section does not include updating the metadata associated therewith to change the car section's nominal position in the collection order.

20. A storage medium as defined in claim 19 wherein:
J) the remembered sets associated with car sections that have not been advanced in the collection order contain entries only for references located in younger cars; and
K) the remembered set associated with a car section that has been advanced ahead of other car sections additionally includes entries for any references in those other car sections that refer to objects in the advanced car.

21. A storage medium as defined in claim 20 wherein, for at least one car section that has been advanced in the collection order:
L) the remembered set associated therewith is stored in a plurality of remembered-set structures; and
M) each of that advanced car section's remembered-set entries for references located in car sections older than that advanced car section is stored in a remembered-set structure separate from the remembered-set structure in which any entry is stored for a reference located in a car section older than that advanced car section.

22. A storage medium as defined in claim 17 wherein:
H) the garbage collector maintains for each car section metadata associated therewith that give that car section's nominal position in the collection order; and
I) the advancing of the given car section includes updating the metadata associated therewith to change the car section's nominal position in the collection order.

23. A storage medium as defined in claim 17 wherein one advancement criterion in the set of at least one advancement criterion is that the size of the remembered set associated with the given car exceed a remembered-set size limit.

24. A storage medium as defined in claim 17 wherein one advancement criterion in the set of at least one advancement criterion is that the number of entries in the remembered set associated with the given car exceed an entry limit.

25. A garbage collector operating in a memory of a computer system and comprising:
A) means for treating at least a portion of a garbage-collected heap in a computer system's memory as divided into car sections;
B) means for searching the car sections for references;
C) means for maintaining for each car section a remembered set associated therewith that contains entries representing locations where references have thereby been detected that refer to objects located in that car section;
D) means for imposing upon the car sections a collection order from older to younger;
E) means for determining whether a given car section satisfies a set of at least one advancement criterion;
F) means operable when a given car section satisfies a set of at least one advancement criterion for advancing the given car section in the collection order; and
G) means for collecting the car sections in increments in which the garbage collector uses the remembered sets to identify reachable objects and reclaims memory occupied by objects not identified as reachable.

* * * * *